US011400811B2

(12) United States Patent
Strandberg

(10) Patent No.: US 11,400,811 B2
(45) Date of Patent: Aug. 2, 2022

(54) REMOTELY CONTROLLING ELECTRONIC FUNCTIONS OF A VEHICLE WITHOUT AN INTEGRATED TOUCHSCREEN

(71) Applicant: Volvo Car Corporation, Gothenburg (SE)

(72) Inventor: Mats Strandberg, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 165 days.

(21) Appl. No.: 16/272,837

(22) Filed: Feb. 11, 2019

(65) Prior Publication Data

US 2020/0254875 A1 Aug. 13, 2020

(51) Int. Cl.
*B60K 35/00* (2006.01)
*G07C 5/00* (2006.01)

(52) U.S. Cl.
CPC .............. *B60K 35/00* (2013.01); *G07C 5/008* (2013.01); *B60K 2370/1438* (2019.05); *B60K 2370/155* (2019.05); *B60K 2370/55* (2019.05)

(58) Field of Classification Search
CPC ................ B60K 35/00; B60K 2370/55; B60K 2370/1438; B60K 2370/155; B60K 2370/182; B60K 2370/184; B60K 2370/195; B60K 2370/197; B60K 2370/52; B60K 2370/563; B60K 2370/566; B60K 2370/569; B60K 2370/573; B60K 2370/577; B60K 2370/583; B60K 2370/5905; B60K 2370/5911;

(Continued)

(56) References Cited

U.S. PATENT DOCUMENTS 8,989,961 B2  3/2015 Chien et al.
9,348,492 B1*  5/2016 Penilla ................... G07C 5/008
(Continued)

FOREIGN PATENT DOCUMENTS

EP      2 830 292 A1    1/2015
WO   2011/047056 A1    4/2011

OTHER PUBLICATIONS

The extended European search report received for EP patent application serial No. 20156774.0 dated Jun. 19, 2020, 9 pages.

*Primary Examiner* — Jonathan M Dager
*Assistant Examiner* — Jean W Charleston
(74) *Attorney, Agent, or Firm* — Amin, Turocy & Watson, LLP

(57) ABSTRACT

Techniques are described for remotely controlling functions of a vehicle without an integrated touchscreen. According to an embodiment, an auxiliary device is provided comprising a display and a processor that executes computer executable components stored in at least one memory. The computer executable component can comprise a feature acquisition component that determines electronic features of the vehicle that are respectively controlled by electromechanical controls of the vehicle, and a display component that displays a graphical user interface via the display wherein the graphical user interface comprises one or more graphical controls for controlling one or more features of the electronic features of the vehicle. The computer executable components further comprising a remote-control component that remotely controls the one or more features via interaction with the one or more graphical controls as rendered via the display.

20 Claims, 14 Drawing Sheets

(58) Field of Classification Search
CPC ..... B60K 37/06; G07C 5/008; G06F 3/04847;
G06F 3/04162; G06F 3/038; G06F 21/44;
G06F 2221/2129; G06F 2221/2149; G06F
3/0484; G06F 3/0488; G06F 21/6218;
G06F 2203/0384; H04M 1/7253; H04M
1/72527
USPC .......................................................... 701/36
See application file for complete search history.

(56) References Cited

U.S. PATENT DOCUMENTS

| | | | |
|---|---|---|---|
| 9,949,093 B2 | 4/2018 | Kotab | |
| 9,992,319 B2* | 6/2018 | Yoon | H04M 1/7253 |
| 2012/0221188 A1 | 8/2012 | Kelly, III | |
| 2014/0163771 A1 | 6/2014 | Demeniuk | |
| 2014/0277937 A1* | 9/2014 | Scholz | H04W 4/50 |
| | | | 701/36 |
| 2014/0309870 A1* | 10/2014 | Ricci | H04L 51/02 |
| | | | 701/36 |
| 2015/0245198 A1* | 8/2015 | Fliege | G08C 17/02 |
| | | | 455/420 |
| 2016/0234367 A1* | 8/2016 | Yoon | H04M 1/72412 |
| 2016/0294614 A1* | 10/2016 | Searle | H04L 67/34 |
| 2017/0084169 A1* | 3/2017 | Sinaguinan | H04M 1/72577 |
| 2017/0092030 A1* | 3/2017 | Badger, II | B60R 25/102 |
| 2017/0200336 A1* | 7/2017 | Schmidt | G07C 9/00174 |
| 2017/0316254 A1 | 11/2017 | Hariri et al. | |
| 2017/0374550 A1 | 12/2017 | Auer | |
| 2018/0009416 A1* | 1/2018 | Maiwand | G07C 9/00571 |
| 2018/0188349 A1* | 7/2018 | Lee | G01S 13/878 |
| 2019/0206151 A1* | 7/2019 | Zucconelli | G07C 5/08 |

* cited by examiner

"Master"

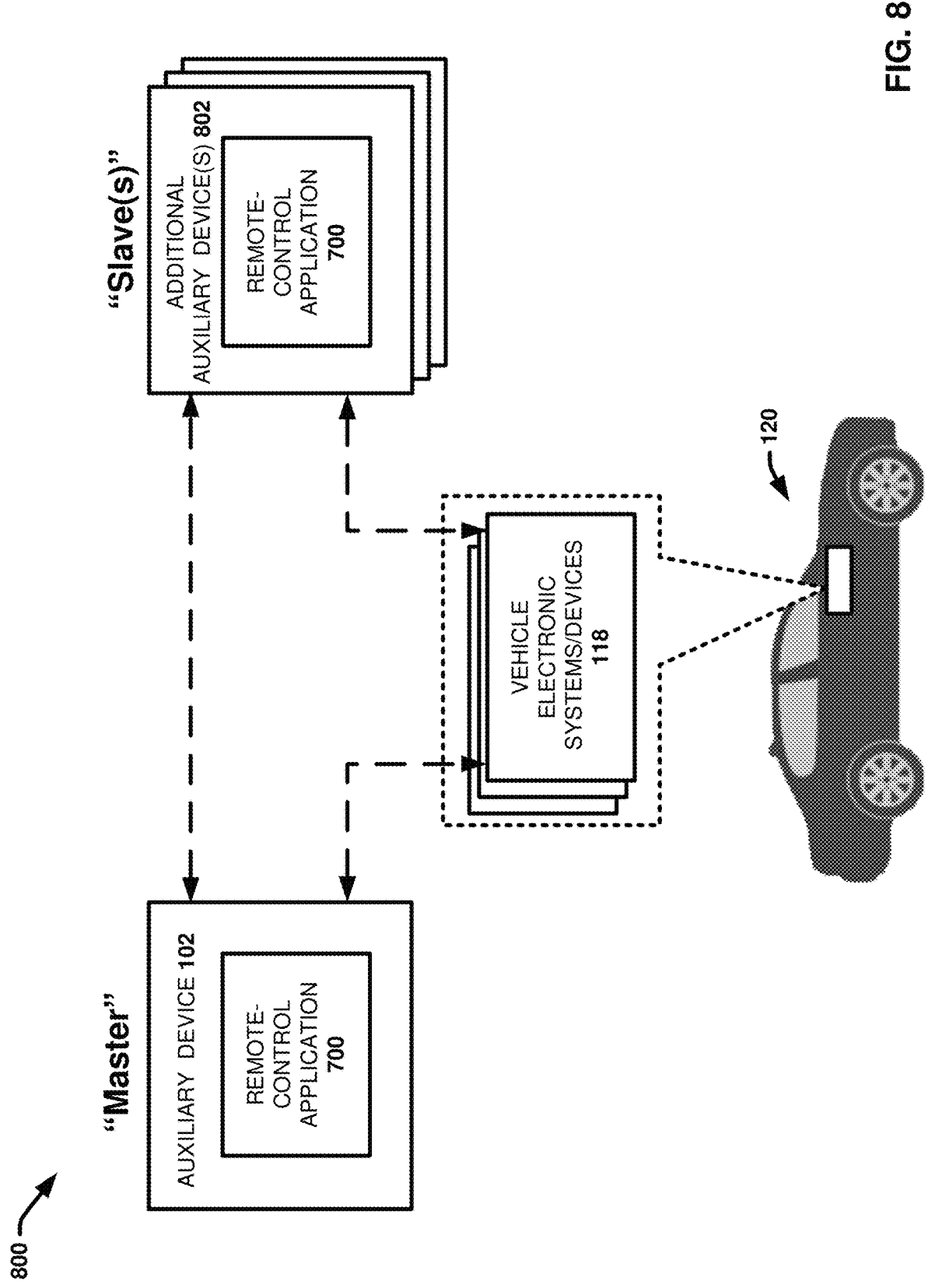

REMOTELY CONTROLLING ELECTRONIC FUNCTIONS OF A VEHICLE WITHOUT AN INTEGRATED TOUCHSCREEN

TECHNICAL FIELD

This application relates to vehicle touchscreens, and more particularly, to techniques for remotely controlling functions of a vehicle without an integrated touchscreen.

BACKGROUND

The rapid increase in smartphone and tablet use in recent years has users accustomed to interacting with electronic devices by a simple swipe or touch of a finger. As a result, automobile manufacturers are turning to touchscreen technology for a variety of applications. For example, many modern vehicles are being implemented with touchscreens that provide touch controls to control many aspects of the vehicle, including infotainment systems, heating, ventilation and air conditioning (HVAC) controls, navigation system, backup camera and other settings. In this regard, modern automobiles are moving away from electromechanical buttons and knobs to having functionality and advanced applications that are accessed and controlled via touchscreens, making legacy automobile without integrated touchscreen less desirable.

Some legacy automobiles enable passengers to connect their mobile devices to the vehicle's onboard computing systems. However, the connected devices merely provide for extending one or more media features and functionalities provided by the mobile device to the vehicle. For example, US. Pat. No. 8,989,961 describes a system wherein users can connect their smartphones to the vehicle's onboard computing system for the purpose of playing media provided by the connoted device using the vehicle's media player or to enable a hands-free calling functionality through the vehicle's speaker system. However, the exchange of information between the connected mobile device and the vehicle is unidirectional. In this regard, although features and functionalities of the connected device can be extended to the vehicle infotainment system, features and functionalities of the vehicle are not extended to the connected device. Accordingly, these systems fail to provide a mechanism to add touchscreen functionality for controlling various features vehicle using a connected mobile device.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate remotely controlling functions of a vehicle without an integrated touchscreen.

According to one or more embodiments, an auxiliary device that facilitates controlling functions of a vehicle without an integrated touchscreen is provided. The auxiliary device can include a display and a processor that executes computer executable components stored in at least one memory. The computer executable component can comprise a feature acquisition component that determines electronic features of the vehicle that are respectively controlled by electromechanical controls of the vehicle, and a display component that displays a graphical user interface via the display wherein the graphical user interface comprises one or more graphical controls for controlling one or more features of the electronic features of the vehicle. The computer executable components can further comprise a remote-control component that remotely controls the one or more features via interaction with the one or more graphical controls as rendered via the display. In various embodiments, the auxiliary device comprises a mobile device that is physically detached from the vehicle. In some embodiments, the display can comprise a touchscreen and the one or more graphical controls comprise touch controls. For example, the device can be selected from a group consisting of a phone, a personal tablet computer, a handheld computing device, and a wearable computing device.

In some embodiments, the computer executable components further comprise a connection component that facilitates establishing a connection between the auxiliary device and an onboard computing system of the vehicle, wherein the remote-control component activates remote control functionality of the one or more graphical controls based on establishment of the connection between the device and the onboard computing system. For example, the connection can comprise a wireless connection (e.g., a BLUETOOTH® connection, an Internet connection, or the like). In accordance with these embodiments, the onboard computing system can comprise a control unit that controls execution of the one or more features and wherein the remote-control component can direct the control unit to execute the one or more features in response to interaction with the one or more graphical controls.

In various embodiments, the computer executable components can further comprise a selection component that selects the one or more features from the vehicle features based on usage privileges granted to the auxiliary device or a user of the auxiliary device. The selection component can also select the one or more features from the vehicle features based on context of the vehicle. The selection component can also select the one or more features from the vehicle features based on location of the auxiliary device relative to the vehicle.

In some embodiments, multiple device can be connected to the vehicle and enabled to remotely control the vehicle functions. With these embodiments, the auxiliary device can comprise a primary device and the computer executable components can further comprise a privileges configuration component that facilitates defining usage privileges for enabling remote-control of the vehicle features by one or more secondary devices. The computer executable components can also comprise an activation/deactivation component that controls activating and deactivating remote-control of the vehicle features by one or more secondary devices. In one or more additional embodiments, the computer executable components further comprise a machine learning component that learns behavior of a user of the auxiliary device in association with usage of the graphical user interface to remotely control the one or more vehicle features and modifies the graphical controls based on the behavior.

In some embodiments, elements described in connection with the disclosed devices and systems can be embodied in different forms such as a computer-implemented method, a computer program product, or another form.

DESCRIPTION OF THE DRAWINGS

FIG. 8 illustrates a block diagram of an example, non-limiting system that facilitates remotely controlling functions of a vehicle by a plurality of connected auxiliary devices in accordance with one or more embodiments of the disclosed subject matter.

DETAILED DESCRIPTION

Figure 1:
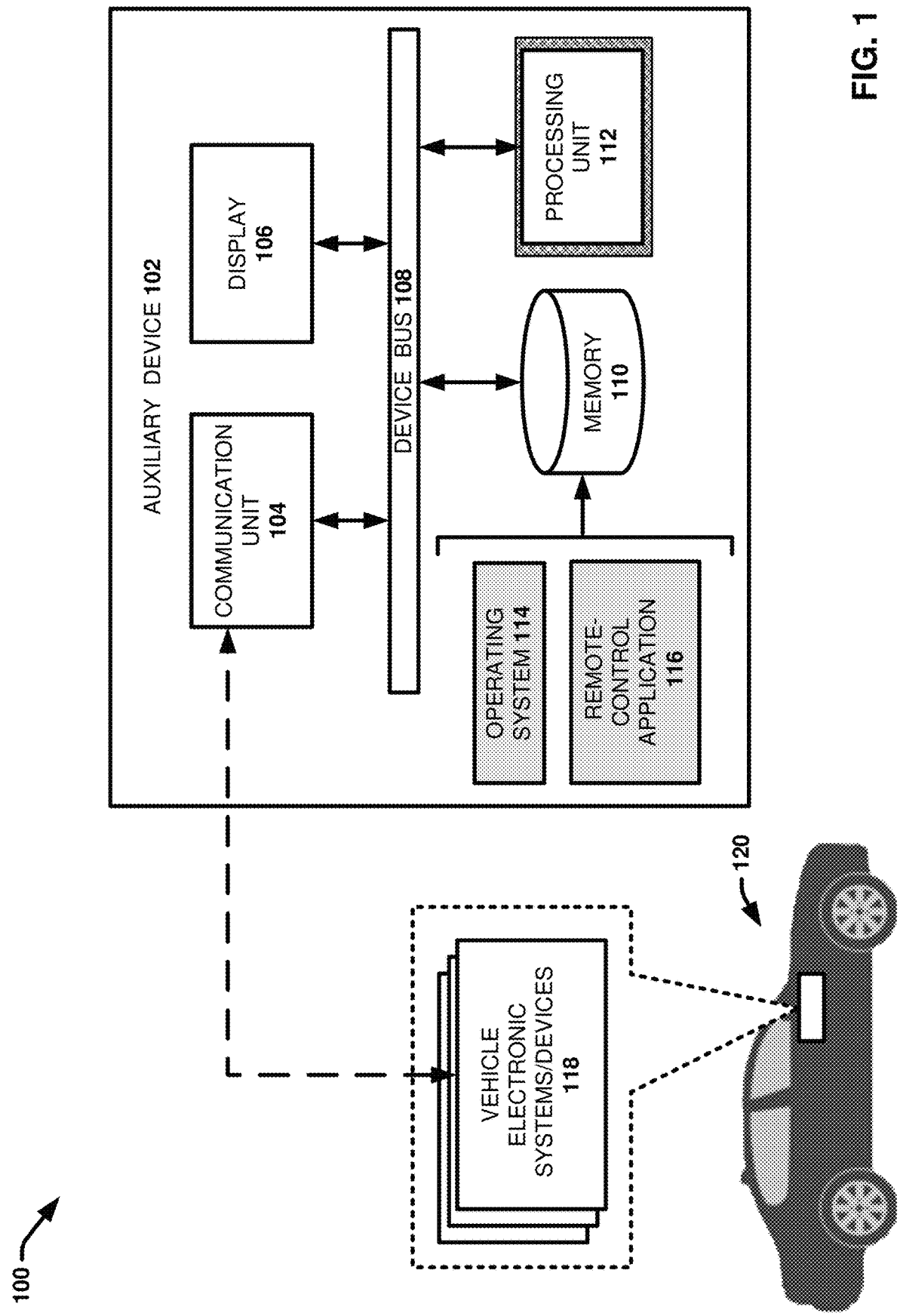
FIG. 1 illustrates a block diagram of an example, non-limiting system that facilitates remotely controlling functions of a vehicle without an integrated touchscreen in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed techniques for adding touchscreen functionality to vehicles (e.g., that were manufactured without touchscreen controls or without an integrated touchscreen). In this regard, the disclosed subject matter provides techniques to augment/modernize/retrofit a vehicle that is for example not equipped with a touchscreen from the factory by connecting an off-the shelf, auxiliary computing device with a touchscreen (e.g., a smartphone, a tablet personal computer, and the like) to the vehicle and using the auxiliary device to control the vehicle functions and/or applications. For example, in various embodiments, the auxiliary computing device can be configured with a remote-control application that facilitates remotely controlling one or more functions and/or applications of a vehicle, such as the functions/applications of the vehicle controlled via legacy electromechanical buttons and knobs. The remote-control application can provide a graphical user interface (GUI) with one or more touch controls that correspond to controls for the vehicle functions and/or applications. For example, the GUI can include touch controls for controlling the vehicle infotainment system, HVAC system, navigation system, locking system, vehicle settings, and the like. In this regard, the GUI can resemble or otherwise correspond to a GUI of a modern vehicle touchscreen often provided in the dashboard center stack of modern vehicles. The specific touch controls provided in the GUI can be based on the specific electronic features included with the vehicle at the time of manufacture (and/or added to the vehicle as an upgrade after manufacture). The auxiliary device can further be operatively and communicatively coupled (e.g., via a wired or wireless communication link) to the vehicle electronic systems/devices that provide the vehicle features (e.g., the infotainment system, the HVAC system, the locking system, etc.), and the remote-control application can provide for remotely controlling these systems/devices using the corresponding touch controls as displayed in the GUI at the auxiliary device.

In some embodiments, the remote-control application can be designed to facilitate controlling vehicle functions/application in association with usage of the auxiliary device while inside the vehicle. In this regard, the auxiliary device can include a device that can be held and operated by a passenger of the vehicle, removably attached to the vehicle dashboard to facilitate access by a driver of the vehicle, and the like. In one or more additional embodiments, the vehicle features and functionalities accessed and controlled via the remote-control application can also be extended to one or remote devices located outside the vehicle (e.g., connected to the vehicle via a wireless communication network, such as the Internet or another suitable network). For example, if the car is parked, the remote-control application can allow pre-approved users of auxiliary device located outside the vehicle to access the vehicle functions/applications to change vehicle settings, parking heater timer, and so on.

In some embodiments, the remote-control application can be configured to enable remote-control of the electronic functions and/or applications of a vehicle. In other embodiments, the specific functions and applications that can be accessed and controlled by an auxiliary device using the remote-control application can be regulated and restricted as appropriate. For example, the driver of the vehicle may be distracted by another passenger in the vehicle that constantly changes the vehicle temperature, radio station, music volume, etc., using an auxiliary device enabled to remotely access and control these vehicle functions. In this regard, the disclosed techniques provide a remote-control authorization and regulation functionality that can allow one or more authorized entities (e.g., the driver, a system administrator, a machine executed regulatory software component, etc.) to control and regulate the specific vehicle functions/applications that can be remotely accessed and controlled by one or more auxiliary devices. For example, in some implementations, the specific vehicle functions/applications that can be remotely accessed and controlled by an auxiliary device (e.g., using the remote-control application) can be based on the user of the auxiliary device. For instance, usage privileges granted to a child can be more restrictive relative to usage privileges granted to an adult, usage privates granted to a stranger can be more restrictive than usage privileges granted to a friend or family member, and the like. In other implementations, the specific vehicle functions/applications that can be remotely accessed and controlled by an auxiliary device can be based on a context of the vehicle (e.g., a driving mode or mobility state of the vehicle, a vehicle speed, a vehicle location, a vehicle route, a time of day, current traffic levels, current weather, number and identity of other passengers in the vehicle, etc.). In another example, the specific vehicle functions/applications that can be remotely accessed and controlled by an auxiliary device can be based on a location of the auxiliary device (e.g., the front passenger seat, the back seat, inside the vehicle, outside the vehicle, within defined distance from the vehicle, etc.), the dimensions of the display screen of the auxiliary device, the operating capabilities of the auxiliary device, and the like.

In various embodiments, two or more auxiliary devices can be connected to a vehicle at the same time and respectively be configured with remote-control applications to remotely control one or more features of the vehicle. With these embodiments, one auxiliary device can be assigned the role of primary control, also referred to herein as the "master," while the other auxiliary device or devices can be assigned the role of secondary control, also referred to herein as the "slave." The master auxiliary device can provide various features and functionalities that facilitate regulating and managing remote-control of the vehicle by the one or more slave auxiliary devices. For example, the master auxiliary device can control what additional auxiliary devices/users can access and remotely control the vehicle features/functions. The master device can also control the specific vehicle functions/applications that can be controlled by each additional auxiliary device, contextual conditions surrounding how and when the additional slave devices can control certain vehicle functions/applications, and the like.

The disclosed subject matter also provides a mechanism to resolve conflicts that may arise in scenarios in which two or more auxiliary devices interface with a same vehicle function or application at or near the same time. For example, a scenario could arise in which two auxiliary devices concurrently attempt to remotely change the HVAC settings of the vehicle, the radio station being played, the speaker volume, etc. Thus, in some embodiments, the disclosed systems can include a conflict resolution component that resolves conflicting instructions respectively received from the two or more auxiliary devices. For example, in some implementations, the conflict resolution component can be implemented at an onboard vehicle computing device that controls one or more electronic features and functionalities of the vehicle. In other implementations, the conflict resolution component can be implemented by the auxiliary device designated as the master. With these embodiments, control commands applied by the slave devices can be relayed to the vehicle electronic systems/devices by the master auxiliary device and the master auxiliary device can select which command of two or more conflicting commands to apply (e.g., using the conflict resolution component).

Various embodiments of the disclosed subject matter are described with reference to a touchscreen of an automobile (or car). However, the disclosed techniques are not limited to automobiles, and can be adapted to facilitate interacting electronic functions/applications used in various types of vehicles and modes of transportation (e.g., a truck, a bus, a train, an airplane, a boat, etc.). The disclosed techniques can also be applied to facilitate interfacing with touchscreens in other domains, (e.g., other than motor vehicles) that can employ touchscreen controls for interfacing with and controlling a system or device.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates remotely controlling functions of a vehicle without an integrated touchscreen in accordance with one or more embodiments of the disclosed subject matter. Embodiments of system 100 and other systems described herein can include one or more machine-executable components embodied within one or more machines (e.g., embodied in one or more computer readable storage media associated with one or more machines). Such components, when executed by the one or more machines (e.g., processors, computers, computing devices, virtual machines, etc.) can cause the one or more machines to perform operations described herein.

System 100 can include a vehicle 120 that comprises one or more vehicle electronic systems/devices 118, and an auxiliary device 102. The vehicle electronic systems/devices 118 can include various types of electronic systems and devices of a vehicle that can be electrically controlled (e.g., via electric signals). The vehicle electronic systems/devices 118 can encompass various automotive electronic domains, including but not limited to: engine electronics, transmission electronics, chassis electronics, passive safety electronics, driver assistance electronics, passenger comfort electronics, infotainment systems, and electronic integrated cockpit systems. For example, the vehicle electronic systems/devices 118 can include a media system (e.g., audio and/or video), a radio system, a back-up camera system, an HVAC system, a lighting system, a cruise control system, a power locking system, a navigation system, a self-driving or semi-safe driving system, a vehicle sensor system, a communication system, and the like. In various embodiments, the vehicle 120 does not include a touchscreen that provides touch controls for accessing and/or controlling various features and functionalities of the vehicle electronic systems/devices 118. In this regard, the vehicle 120 can include electromechanical buttons and/or knobs that provide for controlling the various features and functionalities of the vehicle electronic systems/devices 118.

Although not shown, it should be appreciated that the vehicle electronic systems/devices 118 can respectively include or be operatively coupled to one or more electronic control units (ECUs). An electronic control unit (ECU) is an embedded system in automotive electronics that controls one or more of the electrical systems/devices of a vehicle. The ECUs can include hardware, software, or a combination of hardware and software that is configured to perform functions associated with the respective vehicle electronic systems/devices 118. For example, different types of ECUs can include one or more of an electronic control module (ECM), a powertrain control module (PCM), a transmission control module (TCM, a brake control module (BCM), a central control module (CCM), a central timing module (CTM), a general electronic module (GEM), a body control module (BCM), a suspension control module (BCM), a door control unit (DCU), an engine control unit (ECU), an electric power steering control unit (PSCU), a human-machine interface unit (HMIU), a speed control unit (SCU), a telematic control unit (TCU), and the like. Sometimes one assembly incorporates several of the individual control modules (PCM is often both engine and transmission). The vehicle 120 can have a plurality of different dedicated ECUs for different electronic systems/devices of the vehicle 120, or one or more centralized ECUs configured to control several of the vehicle electronic systems/devices 118. Taken together, the ECUs are sometimes referred to as the vehicle's computing system.

The auxiliary device 102 can comprise a computing device that facilitates remotely accessing and controlling one or more features or functionalities of the vehicle electronic systems/devices 118 of the vehicle 120. For example, the auxiliary device 102 can include but is not limited to: a mobile phone, a smartphone, a tablet personal computer (also referred to as simply a "tablet"), a personal digital assistant (PDA), a heads up display (HUD), virtual reality (VR) headset, an augmented reality (AR) headset, a smartwatch, or another type of wearable computing device, a desktop computer, a laptop computer, a television, an Internet enabled television and the like. In some embodiments, system 100 can be designed to facilitate controlling vehicle functions/application in association with usage of the auxiliary device while inside the vehicle. With these embodiments, the auxiliary device 102 can include a mobile device that can be held and operated by a passenger of the vehicle 120, removably attached to the vehicle dashboard to facilitate access by a driver of the vehicle 120, and the like. In one or more additional embodiments, the vehicle features and functionalities accessed and controlled via the auxiliary device 102 can also be extended to contexts in which the auxiliary device 102 is located outside the vehicle 120. With these embodiments, the auxiliary device 102 can include a mobile device (e.g., a personal user device) as well as a fixed or virtual computing device (e.g., a desktop computer, a server, etc.). As used in this disclosure, the terms "user," "passenger," "driver," and the like refer to a person, entity, system, or combination thereof that can employ system 100 (or additional systems described in this disclosure) using an auxiliary device 102.

In the embodiment shown, the auxiliary device 102 can include a display for 106 for rendering a GUI comprising graphical control that provide for remotely accessing and controlling one or more one or more features or functionalities of the vehicle electronic systems/devices 118 of the vehicle 120. In some embodiments, the display 106 can be or include a touchscreen. With these embodiments, the touchscreen can serve as both an output display device and an input device for the auxiliary device 102. The touchscreen can comprise suitable hardware that registers input events in response to touch (e.g., by a finger, stylus, gloved hand, pen, etc.). The type of the touchscreen can vary and can include but is not limited to, a resistive touchscreen, a surface capacitive touchscreen, a projected capacitive touchscreen, a surface acoustic wave touchscreen, and an infrared touchscreen. In other embodiments the display 106 can be include another type of display device capable of rendering a GUI that can be interfaced with using other types of input devices (e.g., other than a touchscreen), such as a keypad, a keyboard, a mouse, gesture controls, electromechanical buttons/knobs, etc.

The auxiliary device 102 can be communicatively and operatively coupled to the one or more vehicle electronic systems/devices 118 either via a wireless and/or wired connection. In this regard, the auxiliary device 102 can include a communication unit 104 that comprises suitable hardware and/or software that facilitates connecting the auxiliary device 102 to the vehicle electronic systems/devices 118, or more particularly, to the one or more ECUs of the vehicle electronic systems/devices 118, via a wireless or wired connection. For example, in some embodiments, the communication unit 104 can facilitate connecting the auxiliary device 102 to the vehicle electronic systems/devices 118 via one or more networks. The one or more networks can include wired and wireless networks, including but not limited to, a personal area network (PAN), a local area network (LAN), a cellular network, a wide area network (WAN, e.g., the Internet), and the like. For example, using the communication unit 104, the auxiliary device 102 can communicate with vehicle electronic systems/devices 118 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), fifth generation partnership project (5G) communication system, third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, near field communication (NFC) technology, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

The auxiliary device 102 can include or be operatively coupled to at least one memory 110 and at least one processing unit 112. The processing unit 112 can be any of various available processors. Dual microprocessors and other multiprocessor architectures also can be employed as the processing unit 112. In various embodiments, the at least one memory 110 can store computer-executable instructions embodied as software functions/applications that when executed by the at least one processing unit 112, facilitate performance of operations defined by the executable instruction. In the embodiment shown, these computer-executable instructions or software components can include at least an operating system 114 and a remote-control application 116. The auxiliary device 102 can further include a device bus 108 that provides for connecting the various devices/components of the auxiliary device 102 (e.g., the communication unit, the display 106, the memory 110, and the processing unit 112).

The remote-control application 116 can provide various features and functionalities that facilitate remotely accessing and/or controlling one or more features of the vehicle electronic systems/devices 118. In various embodiments, the remote-control application 116 can generate and/or provide one or more GUIs that can be rendered via the display 106 (or another suitable display). The one or more GUIs can include one or more interactive graphical elements that correspond to controls (e.g., touch controls) for the various functions and/or applications of the vehicle electronic systems/devices 118. For example, the GUIs can present one or more selectable graphical elements that can respectively correspond to a specific electronic system/device of the vehicle, a control for a function of the electronic system/device, interactive and/or informative data associated with the electronic system/device, a link to interactive and/or informative data associated with the electronic system/device, and the like, wherein selection and/or interaction with the graphical element as displayed on the display 106 via touch activates the corresponding functionality. For example, in some implementations, the one or more GUI can include controls for controlling one or more features and functionalities of the vehicle electronic systems/devices 118 for which only legacy electromechanical buttons/knobs are provided within the vehicle (e.g., a radio system, an HVAC system, a power locking system, a power seat control system, a power window system, a vehicle lighting system, a cruise control system, etc.). In another example, the one or more GUIs can include selectable graphical elements (e.g., buttons or bars) corresponding to a vehicle navigation application, a media application, a phone application, a back-up camera function, a car settings function, a parking assist function, and the like.

In various embodiments, the one or more GUIs provided by the remote-control application 116 can resemble or otherwise correspond to a GUI of a modern vehicle touchscreen often provided in the dashboard center stack of modern vehicles. In this regard, the remote-control application 116 can provide for retrofitting a vehicle with touchscreen control functionality provided at an auxiliary device 102 coupled to the vehicle in scenarios in which the vehicle was not originally manufactured with a touchscreen. The specific touch controls provided in the GUI can be based on the specific electronic features included with the vehicle at the time of manufacture (and/or added to the vehicle as an upgrade after manufacture). In some implementations, the remote-control application 116 can also facilitate connecting the auxiliary device 102 to the vehicle electronic systems/devices 118 (e.g., and/or the respective ECUs of the vehicle electronic systems/devices 118) in association with the communication unit 104. The remote-control application 116 can further enable access to and/or remote-control of one or more features and functionalities of the vehicle electronic systems/devices 118 using the corresponding controls as displayed in the GUI at rendered via the display 106.

Figure 2:
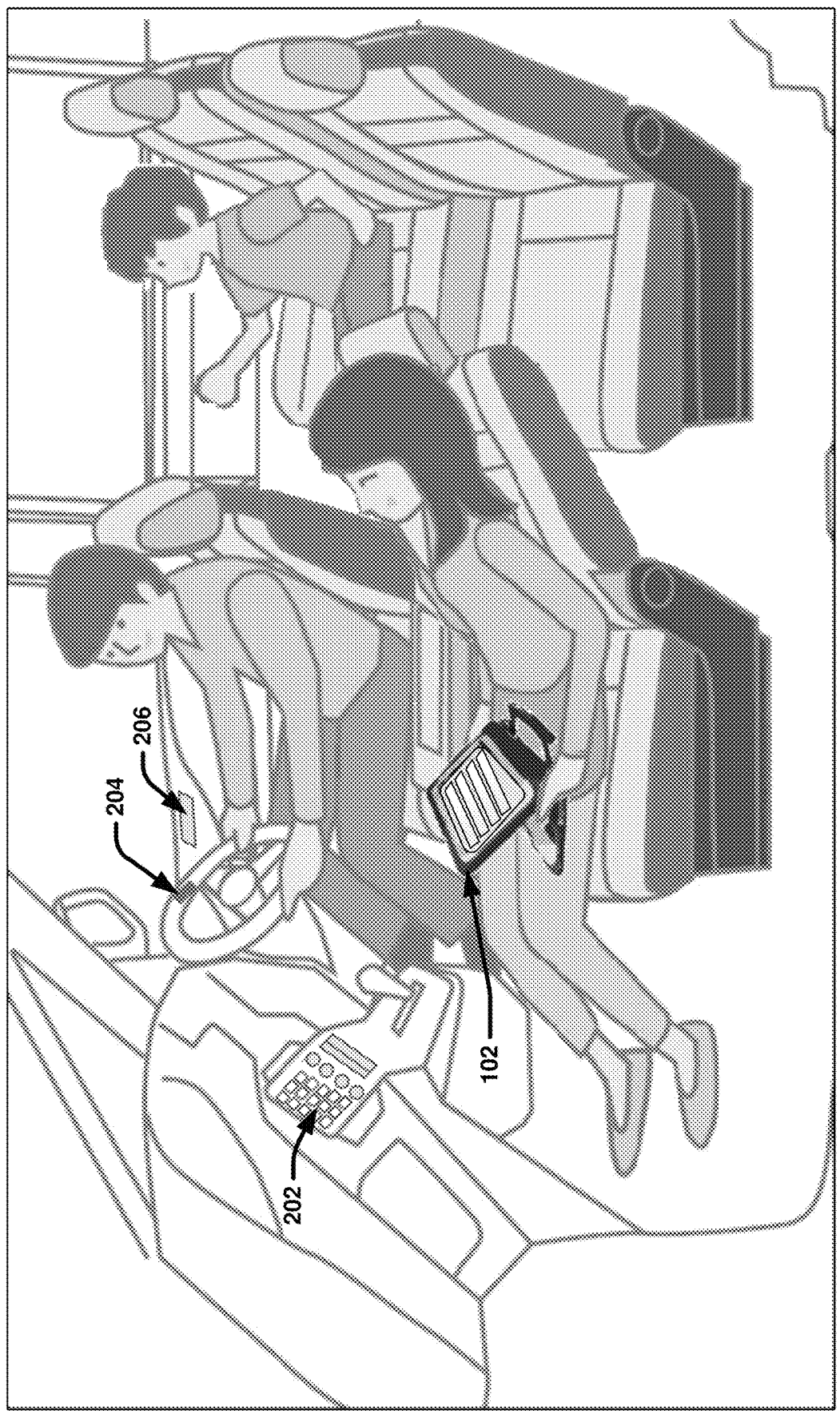
FIG. 2 presents an illustration of an example use case for remotely controlling functions of a vehicle without an integrated touchscreen in accordance with one or more embodiments of the disclosed subject matter.

For example, FIG. 2 presents an illustration of an example use case for remotely controlling one or more functions of a vehicle without an integrated touchscreen in accordance with one or more embodiments of the disclosed subject matter. With reference to FIG. 2 in light of FIG. 1, depicted is a view of the interior of a vehicle (e.g., vehicle 120) that does not include an integrated touchscreen for controlling various functions and/or applications of the vehicle. For example, in the embodiment shown, the center stack of the vehicle dashboard includes various controls 202 represented by electromechanical buttons and knobs. These controls 202 can include for example, one or more controls for the vehicle HVAC system, one or more controls for a radio and/or media system of the vehicle, one or more controls for a phone/calling function of the vehicle, one or more controls for a navigation application of the vehicle, controls for changing vehicle settings, and the like. The vehicle also includes one or more controls 204 provided on the steering wheel, which can include for example, a control for the vehicle headlights, a control for the vehicle cruise control system, a control for the automated windshield wipers and the like. The vehicle further includes one or more controls 206 provided on the driver's side door, such as controls for automated windows, controls for a door locking system of the vehicle, and the like.

In accordance with this example implementation, an auxiliary device 102 operated by a passenger of the vehicle can include the remote-control application 116 and provide for remotely controlling one or more of the vehicle functions/applications, such as the vehicle functions/applications configured at manufacture to be controlled using controls 202, controls 204 and/or control 206. In this regard, the auxiliary device 102 can connect to the vehicle electronic systems/devices that provide and/or control the various vehicle functions/applications. For example, the auxiliary device 102 can connect to respective ECUs of the vehicle HVAC system, the radio/media system, the cruise control system, the locking system, etc. The auxiliary device 102 can further render a GUI provided by the remote-control application 116 that includes interactive/selectable graphical elements corresponding to controls for the respective vehicle electronic systems/devices. The remote-control application 116 can further enable and facilitate remotely controlling the respective vehicle electronic systems/devices based on user interaction with their corresponding graphical elements (e.g., touch controls) as displayed via the GUI rendered at the auxiliary device 102. In this example implementation, the auxiliary device 102 includes a handled computing device (e.g., a tablet, a smartphone, a laptop computer, etc.) that is held and operated by a passenger of the vehicle. In some implementations, the auxiliary device 102 can be mounted on the vehicle dashboard (e.g., over the controls 202) to facilitate access and interaction by the driver of the vehicle. Still in other implementations, the auxiliary device 102 and/or one or more additional auxiliary devices can be mounted at other locations in the vehicle (e.g., on the backside of a passenger seat), held and operated by additional passengers in the vehicle, located outside of the vehicle, and the like.

Figure 3:
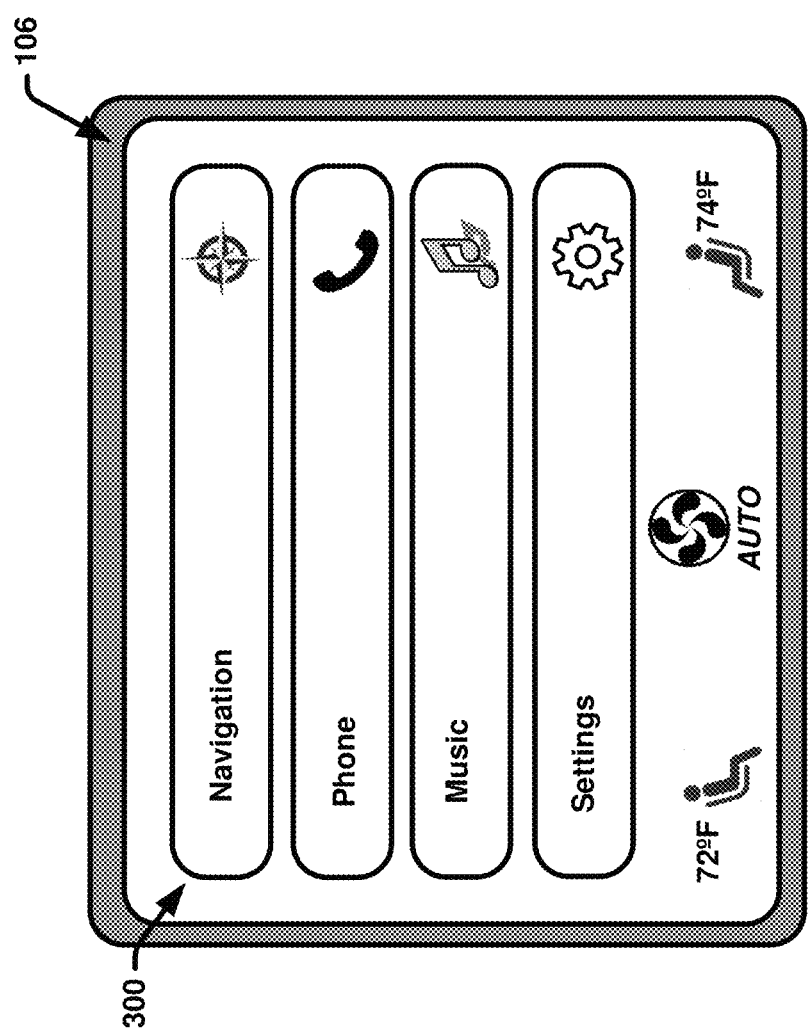
FIG. 3 presents an enlarged view of an example graphical user interface (GUI) that can be generated/rendered by a remote-control application deployed at an auxiliary device to facilitate remotely controlling one or more functions of a vehicle in accordance with one or more embodiments of the disclosed subject matter.

FIG. 3 presents an enlarged view of an example GUI 300 that can be generated/rendered by a remote-control application (e.g. remote-control application 116) deployed at an auxiliary device (e.g., auxiliary device 102) to facilitate remotely controlling one or more functions of a vehicle (e.g., vehicle 120) in accordance with one or more embodiments of the disclosed subject matter. Repetitive description of like elements employed in respective embodiments is omitted for sake of brevity.

In various implementations, using GUI 300 as rendered on a display 106 of an auxiliary device 102, a user can touch or otherwise interface with the various selectable graphical elements to access and/or control the corresponding vehicle functions/applications. For instance, example GUI 300 comprises various selectable graphical elements represented by selectable buttons or bars. The selectable buttons comprise text and icons to indicate the function or application they represent, which include for example, a navigation application, a phone application, a music application and a car settings function. The specific applications/functions represented in GUI 300 are merely exemplary and can vary depending on the electronic features and functionalities of the vehicle. In accordance with this example implementation, the applications/functions can be selected/activated by touching or tapping anywhere within the defined area of the corresponding bar. GUI 300 also includes interactive controls for the HVAC system of the vehicle. In some implementations, selection of a button or bar corresponding to an application or function can result in the generation of a new window or GUI page comprising additional selectable icons or widgets associated with the selected application. For example, selection of the music application can result in generation of a new GUI page or window that includes additional buttons or widgets for different media sources (e.g., radio, a streaming music system, music from an auxiliary input device or phone, etc.), different radio stations, volume controls, and the like. The type and appearance of the selectable graphical elements can vary. For example, the selectable graphical elements can include icons, symbols, widgets, windows, tabs, text, images, and the like. Various additional features and functionalities of the remote-control application 116 are discussed in greater detail infra with reference to FIG. 5.

Figure 4:
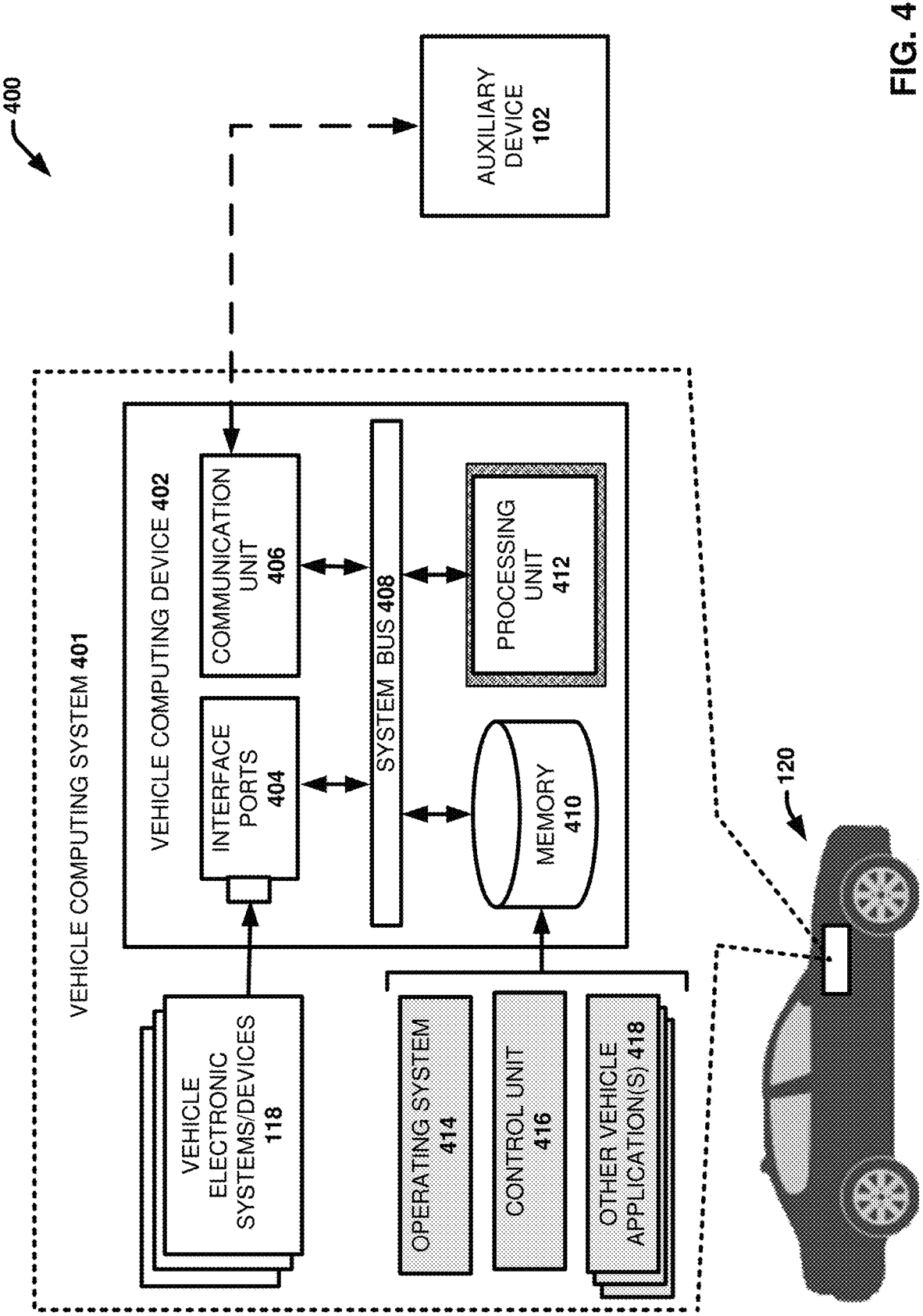
FIG. 4 illustrates a block diagram of another example, non-limiting system that facilitates remotely controlling functions of a vehicle without an integrated touchscreen in accordance with one or more embodiments of the disclosed subject matter.

FIG. 4 illustrates a block diagram of another example, non-limiting system 400 that facilitates remotely controlling functions of a vehicle without an integrated touchscreen in accordance with one or more embodiments of the disclosed subject matter. System 400 can include same or similar feature and functionalities as system 100 with the integration of a vehicle computing system 401 coupled to the vehicle electronic systems/devices 118. In the embodiment shown, the internal components of the auxiliary device 102 are not depicted merely for ease of illustration. In this regard, it should be appreciated that although not shown, the auxiliary device 102 can include the various internal components shown in FIG. 1 (e.g., the communication unit 104, the display 106, the device bus 108, the memory 110, the remote-control application 116, the operating system 114, and the at least one processing unit 112). Repetitive description of like elements employed with respective embodiments is omitted for sake of brevity.

In various embodiments, the vehicle electronic systems/devices 118 can be operatively and/or communicatively coupled to at least one onboard, vehicle computing device 402 to enable and facilitate control and operation of the respective vehicle electronic systems/devices 118. The vehicle computing device 402 can facilitate executing and controlling one or more operations of the vehicle, including one or more operations or functions of the vehicle electronic systems/devices 118 using machine-executable instructions. In this regard, the vehicle computing device 402 can include or be operatively coupled to at least one memory 410 and at least one processing unit 412. The at least one processing unit 412 can be any of various available processors, including one or more microprocessor respectively associated with one or more ECUs of the vehicle electronic systems/devices 118, one or more dual microprocessors and other single core or multiprocessor architectures. In various embodiments, the at least one memory 110 can store computer-executable instructions embodied as software functions/applications that when executed by the at least one processing unit 412, facilitate performance of operations defined by the executable instruction. In the embodiment shown, these computer-executable instructions or software components can include at least an operating system 414. The operating system 414 can act to control and allocate resources of the vehicle computing device 402. It is to be appreciated that the claimed subject matter can be implemented with various operating systems or combinations of operating systems.

The computer-executable instructions or software components stored in the memory 410 can also include a control unit 416. In various embodiments, the control unit 416 can provide for controlling various features and functionalities of the vehicle electronic systems/devices 118. For example, the control unit 416 can include or otherwise be associated with respective ECUs for the vehicle electronic systems/devices 118. In this regard, the control unit 416 can include software that provides for determining and/or issuing appropriate control commands to cause the vehicle electronic systems/devices 118 to perform their respective functions. In accordance with these embodiments, the auxiliary device 102 can interface with the control unit 416 using the remote-control application 116 to direct the control unit 416 to cause the vehicle electronic systems/devices 118 to perform a desired function. In this regard, the control unit 416 can be configured to receive and execute control commands provided by (e.g., sent by, transmitted by, etc.), an auxiliary device (e.g., using remote-control application 116) to enable remote-control of the vehicle electronic systems/devices 118 by the auxiliary device. In some embodiments, the memory 410 can also store one or more other vehicle applications 418 (e.g., software applications). For example, the one or more other vehicle applications 418 can include for example, a navigation application, a media player application, an Internet radio application, a vehicle information gathering and reporting application, a notification application (e.g., that provides information regarding monitored states/conditions of the vehicle), an emergency roadside assistance application, a diagnostic reporting application (e.g., that provides readings/measurement data from vehicle sensors regarding states of vehicle components), and the like. In various implementations, these other vehicle applications 418 can be executed by the processing unit 412 yet also remotely controlled and/or accessed by the auxiliary device 102 using the remote-control application 116 (e.g., using known API for the other vehicle applications 418).

The vehicle computing device 402 can further include one or more interface ports 404, a communication unit 406, and a device bus 408 that communicatively couples the various components of vehicle computing device 402 (e.g., the one or more interface ports 404, the communication unit 406, the memory 410 and the processing unit 412). The communication unit 406 can include same or similar features and functionalities as communication unit 104. The one or more interface ports 404 can connect the one or more vehicle electronic systems/devices 118 to the vehicle computing device 402. For example, the one or more interface ports 404 can include, a serial port, a parallel port, a game port, a universal serial bus (USB) and the like. In some implementation, the vehicle electronic systems/devices 118 can include a display screen for displaying information yet does not include interactive or touchscreen technology. For example, the display screen can be configured to display images (e.g., maps, back-up camera view, etc.) and/or text, yet not enable reception of input via user interaction with the display screen. In some implementations, the auxiliary device 102 can connect to the vehicle computing device 402 via a wired connection from the auxiliary device 102 to an interface port of the one or more interface ports 404 (e.g., via a USB cable or the like).

Figure 5:
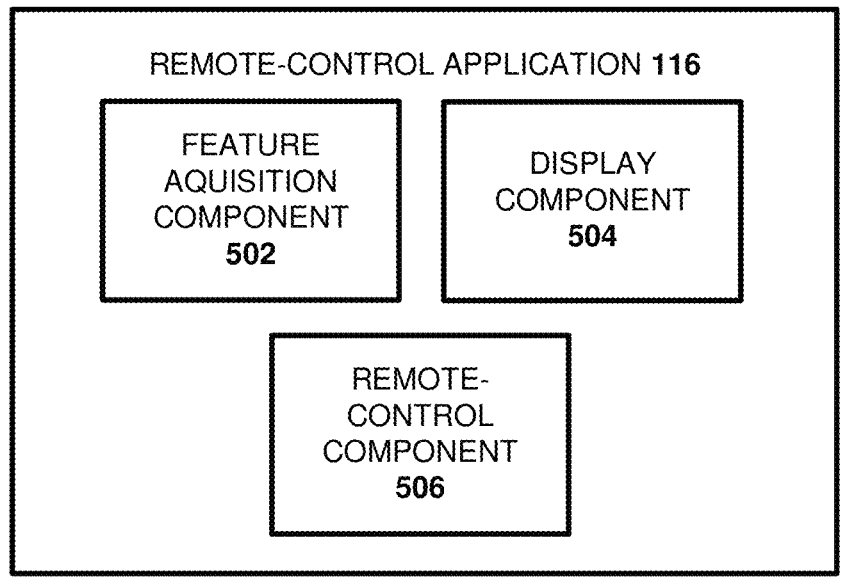
FIG. 5 illustrates a block diagram of an example, non-limiting remote-control application that facilitates remotely controlling functions of a vehicle without an integrated touchscreen in accordance with one or more embodiments of the disclosed subject matter.

FIG. 5 illustrates a block diagram of a non-limiting example of remote-control application 116 in accordance with one or more embodiments of the disclosed subject matter. Repetitive description of like elements employed in respective embodiments is omitted for sake of brevity.

With reference to FIGS. 1, 4 and 5, the remote-control application 116 can provide various features and functionalities that facilitate remote-control, by an auxiliary device 102, of electronic functions and/or applications of a vehicle that does not include an integrated touchscreen (e.g., vehicle 120). These electronic functions and applications can include those provided by the vehicle electronic systems/devices 118, and in some implementations, those provided the one or more other vehicle applications 418. The remote-control application 116 can include computer executable components that can be stored in memory (e.g., memory 110 or the like) that when executed by a processing unit (e.g., processing unit 112 or the like) facilitate performance of the instructions defined by the computer executable components. In the embodiment shown, these computer executable components can include a feature acquisition component 502, a display component 504 and a remote-control component 506.

The feature acquisition component 502 can facilitate acquiring knowledge about the controllable electronic features, functions and/or applications of a vehicle that does not include an integrated touchscreen. This type of knowledge is referred to herein as "feature information." For example, the feature acquisition component 502 can acquire feature information regarding what electronic systems/devices (e.g., vehicle electronic systems/devices 118) are included with a vehicle and the various features, functionalities and/or applications provided by these electronic systems/devices. In implementations in which the vehicle comprises one or more other vehicle applications 418, the feature information can also include information identifying these one or more other vehicle applications 418 and the features and functionalities of these one or more other vehicle applications 418.

In some embodiments, the remote-control application 116 can be pre-configured with feature information for a vehicle. For example, in one or more embodiments, the remote-control application 116 can include a software application that can be provided with the auxiliary device 102 by the manufacture (e.g., preinstalled on the auxiliary device 102) and/or downloaded from a remote, network accessible or cloud based application system, often referred to as an "application store." For example, the application store can include an online portal, marketplace or digital distribution platform through which software programs are made available for procurement and download (e.g., via the Internet).

In some implementations, the remote-control application 116 can be tailored to a specific vehicle, such as a specific vehicle make, model, year, etc. With these implementations, the vehicle feature information can be built into or otherwise included with the remote-control application 116 based on the known features and functionalities provided with the specific vehicle make, model, year, etc. In this regard, many different versions of the remote-control application 116 can be developed and made available for download to or preinstalling on an auxiliary device, and an entity (e.g., a user or owner of a particular vehicle, the auxiliary device manufacturer, etc.) can select and download or otherwise install the version of the remote-control application that corresponds to the particular vehicle the entity would like to remotely control. In other implementations, the remote-control application 116 can include a universal application that can be tailored to remotely control a variety of different vehicles with different makes, models, years, etc. With these implementations, the remote-control application 116 can be pre-configured with feature information and/or provided access to feature information (e.g., at a network accessible system/database) for all of the different vehicles. The feature acquisition component 502 can further allow a user to provide input selecting the specific type of vehicle they would like to remotely control (e.g., by make, model, year, and/or other suitable criteria). Based on the received input, (e.g., selecting a specific make, model, year, etc.), the feature acquisition component 502 can access and retrieve (e.g., in memory 110 and/or from the network accessible system/database) the corresponding feature information for that vehicle.

In the example embodiment described above, the feature acquisition component 502 can acquire feature information for a vehicle without connecting to the vehicle. (As used herein, reference to "connecting to" or "connection to" a vehicle as used herein indicates more specifically, connecting to the vehicle electronic systems/devices 118, connecting to the ECUs for the respective vehicle electronic systems/devices 118 and/or connecting to the vehicle computing device 402). In various additional embodiments, the feature acquisition component 502 can acquire vehicle feature information based on and/or in response to connecting to the vehicle. With these embodiments, the auxiliary device 102 can connect to the one or more ECUs for the respective vehicle electronic systems/devices 118 and/or connect to the vehicle computing device 402 using communication unit 104. For example, in some implementations, using the communication unit 104, the auxiliary device can establish a wireless connection to the vehicle computing device 402 using a suitable wireless communication protocol (e.g., BLUETOOTH®, Wi-Fi, etc.). In other implementations, the auxiliary device 102 can connect to the vehicle computing device 402 and/or the one or more ECUs for the vehicle electronic systems/devices 118 using a direct wired/cable connection (e.g., using a USB cable or the like). The feature acquisition component 502 can further be configured to acquire/receive feature information for the vehicle based on connection to the vehicle. For example, in some implementations, based on connection to the vehicle computing device 402, the feature acquisition component 502 can access the memory 410, the control unit 416 and other vehicle applications 418 to identify and retrieve information regarding the applications and the vehicle electronic systems/devices 118 included with the vehicle. In another implementation, based on connection to the vehicle computing device 402, the feature acquisition component 502 can send a request to the vehicle computing device 402 and/or the one or more control unit 416 for the feature information. Based on the reception of the request, the one or more control unit 416 can be configured to provide the feature acquisition component 502 with the requested feature information.

The display component 504 can generate and/or provide a GUI (e.g., GUI 300 and the like) for rendering at the auxiliary device 102 that facilitates remotely controlling one or more electronic features, functionalities and/or applications of the vehicle based on the feature information. In particular, the display component 504 can generate and/or provide a GUI with interactive graphical elements or objects that correspond to controls (e.g., touch controls in implementations in which the auxiliary device 102 comprises a display 106) for accessing and/or controlling one or more features and/or functionalities of the vehicle electronic systems/devices 118 and/or other vehicle applications 418. The specific graphical elements included in the GUI can be based on the features and/or functionalities of the vehicle electronic systems/devices 118 and/or other vehicle applications 418 identified in the feature information. In some embodiments in which feature information for a vehicle is known based on a specific make/model of the vehicle, the GUI for remotely controlling and/or accessing the features of the vehicle can be preconfigured. In this regard, the GUI for a specific vehicle can be included with the remote-control application 116 (e.g., stored in memory 110) or otherwise accessed and retrieved by the display component 504 (e.g., from a remote datastore).

In other embodiments in which the feature acquisition component 502 receives the feature information for a vehicle based on connection to the vehicle, the display component 504 can generate the GUI by combining graphical control elements for the respective features identified in the feature information and predefined GUI data. For example, the display component 504 can access predefined GUI data that associates controllable graphical elements, icons, text, images, widgets etc., with defined vehicle features and functionalities. For instance, a HVAC system of model number N can be associated with defined set of graphical control elements, a media system of model number Y can be associated with another set of graphical control elements and so on. The predefined GUI data can be included with the remote-control application (e.g., stored in memory 110) and/or access and retrieved by the display component 504 from a remote data store or system (e.g., accessed via a network). In this regard, the display component 504 can select and retrieve the appropriate controllable graphical elements for the identified vehicle features and combine these graphical elements in a suitable manner to generate or create the GUI for remotely controlling the vehicle features by the auxiliary device 102. In some implementations of these embodiments, after the display component 504 creates a GUI for a vehicle in association with the initial connection of the auxiliary device 102 to the vehicle, the display component 504 can save the GUI for that vehicle (e.g., in memory 110). In this regard, when the auxiliary device 102 subsequently connects to the same vehicle, the display component 504 can retrieve and display the previously created GUI for that vehicle.

The visual appearance of the vehicle GUI provided and/or generated by the display component 504 can vary. In various embodiments, the GUI can correspond to or otherwise resemble an interactive GUI for interfacing with a vehicle comprising a touchscreen. For instance, the GUI generated and/or provided by the display component 504 for a vehicle without a touchscreen of make 10, model 10, and year 2010, can correspond to a a vehicle GUI configured for rendering on a touchscreen of a more modern version of that vehicle, (e.g., of make 10, model 18, year 2018). In some implementations, the display component 504 can control the specific graphical elements (and their corresponding applications or functions) that are displayed on respective GUI pages, the arrangement of the graphical elements, the number of graphical elements, the size and shape of the graphical elements, the spacing of the graphical elements and the like, based on various factors. For example, the display component 504 can control the visual appearance of a vehicle GUI presented at an auxiliary device 102 based on the dimensions of the display 106 (or another type of display screen), an operating system of the auxiliary device 102, and/or the capabilities of the auxiliary device 102. In another example, as discussed in greater detail with reference to FIG. 6, the display component 504 can control the appearance of the GUI rendered at an auxiliary device 102 based on preferences of the user of the auxiliary device 102, usage privileges granted to the auxiliary device 102 and/or a user of the auxiliary device, a context of the vehicle 120, and the like.

The remote-control component 506 can further enable and facilitate remote-control of and/or access to the electronic features, functions, and/or applications of the vehicle represented by the interactive graphical controls displayed in the GUI at the auxiliary device 102 based at least on connection of the auxiliary device 102 to the vehicle. In this regard, in some embodiments, based on connection of the auxiliary device 102 to the vehicle and opening of the remote-control application 116 at the auxiliary device 102, the display component 504 can generate and/or provide the GUI for the vehicle with interactive graphical elements for remotely controlling and/or accessing one or more electronic features, functionalities, and/or applications of the vehicle. The remote-control component 506 can further activate the interactive graphical elements of the vehicle GUI such that user interaction with the graphical elements can allow a user to remotely interface with and control/access the corresponding electronic features, functionalities, and/or applications of the vehicle. In some embodiments, the remote-control component 506 can activate all available interactive controls included in the GUI for all of the available electronic features, functions and/or applications of the vehicle. In other embodiments, as discussed infra with reference to FIG. 6, the remote-control component 506 can regulate and restrict activation and deactivation of the specific vehicle features, functions and/or applications that can be accessed and controlled by an auxiliary device 102 using the remote-control application 116 as appropriate based on specific usage privileges granted to the auxiliary device and/or a user of the auxiliary device, a context of the vehicle, and the like.

The remote-control component 506 and further control execution of the one or more vehicle features and functionalities in response to user interaction with the activated GUI rendered at the auxiliary device. For example, the remote-control component 506 can facilitate generating and issuing control commands by the auxiliary device 102 for controlling one or more vehicle functions/application based on user interaction with the corresponding graphical control elements in the GUI. The remote-control component 506 can further facilitate communicating (e.g., using communication unit 104) the control commands to the vehicle electronic systems/devices 118 (and/or other vehicle applications 418) to cause the vehicle electronic systems/devices 118 (and/or other vehicle applications 418) to carry out the functions. For example, the remote-control component 506 can communicate the control commands to the respective ECUs and/or control unit 416 of the vehicle electronic systems/devices 118. Based on reception of the control commands from the auxiliary device 102, the respective ECUs and/or control unit 416 of the vehicle electronic systems/devices 118 can execute the control commands to direct or otherwise cause the vehicle electronic systems/devices 118 to perform the functions defined by the control commands. In this regard, in implementations in which the auxiliary device comprises a display 106, using the vehicle touch controls as displayed at the auxiliary device 102, a user can select and interact with the touch controls as if the user were selecting and interacting with the electromechanical knobs/buttons of the vehicle (e.g., controls 202, controls 204, controls 206 and the like). The remote-control component 506 can further receive and interpret the input commands generated based on user interaction with touch controls displayed at the auxiliary device and cause the vehicle electronic systems/devices 118 to execute the actions represented by the input commands.

In some embodiments, the display component 504 and/or the remote-control component 506 can provide for interacting with a vehicle GUI rendered at an auxiliary device 102 when the auxiliary device is disconnected from the vehicle computing device 402 and/or a remote-control session is otherwise not activated. With these embodiments, a user can view and interface with the GUI, however features and functionalities afforded by the GUI that enable remote-control of and/or access to one or more features and functions of the vehicle can be deactivated. For example, the display component 504 can enable user interaction with a representation of the vehicle GUI in an "disconnected mode." In the disconnected mode, the remote-control component 506 can deactivate one or more controls for remotely controlling one or more vehicle functions/applications represented by graphical elements in the GUI such that a user cannot remotely control these vehicle functions/applications unless the auxiliary device 102 is connected to the vehicle computing device 402. In some implementations, the display component 504 can visually distinguish one or more of the graphical elements of the GUI corresponding to deactivated controls (e.g., by graying the deactivated controls out, making the deactivated controls partially transparent, etc.). In other implementations, the display component 504 can remove the deactivated graphical controls from the GUI. For example, the GUI can include a navigation application that provides for looking up destination locations, creating travel routes, and further executing a selected travel route by causing a navigation system of the vehicle to determine and track the vehicle's location in real-time, provide live directions and mapping information, and the like. In some implementation, when in disconnected mode, some features of the navigation application can be activated while others deactivated and grayed out. For example, the activated features can include those that allow the user to look up destination locations and plan routes, while the control feature that enable a user to direct the vehicle navigation system to apply or execute a desired route can be deactivated and grayed out.

Figure 6:
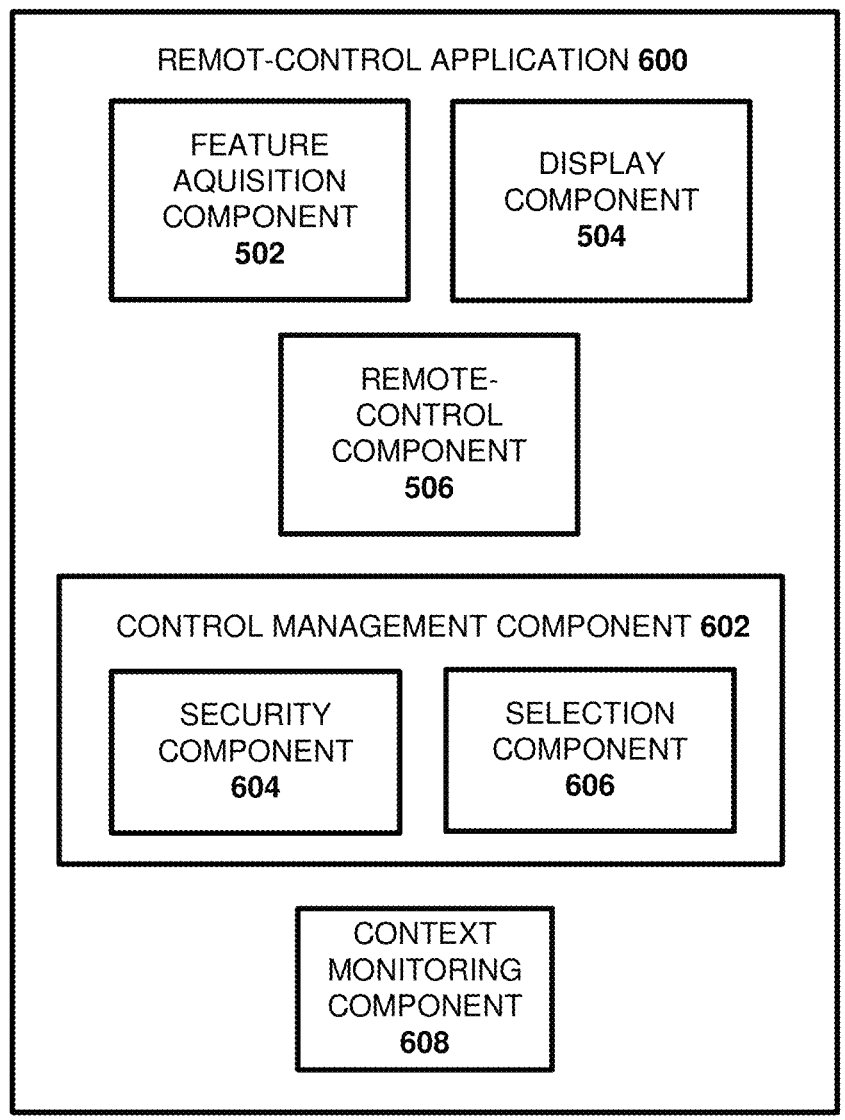
FIG. 6 illustrates a block diagram of another example, non-limiting remote-control application that facilitates remotely controlling functions of a vehicle without an integrated touchscreen in accordance with one or more embodiments of the disclosed subject matter.

FIG. 6 illustrates a block diagram of another example, non-limiting, remote-control application 600 that facilitates remotely controlling functions of a vehicle (e.g., vehicle 120) without an integrated touchscreen in accordance with one or more embodiments of the disclosed subject matter. Remote-control application 600 includes same or similar features and functionalities as remote-control application 116 with the addition of control management component 602 and context monitoring component 608. In various embodiments, an auxiliary device 102 of the disclosed systems (e.g., system 100, system 400 and the like) can include remote-control application 600 or remote-control application 116. Repetitive description of like elements employed in respective embodiments is omitted for sake of brevity.

The control management component 602 can provide for managing and regulating remote-control of one or more features, functionalities, and/or applications of a vehicle by an auxiliary device 102 and/or user of the remote-control application 600. In some embodiments, the control management component 602 can control what auxiliary devices and/or users of the remote-control application 600 can connect to the vehicle and/or be allowed to remotely access and/or control the one or more one or more features, functionalities, and/or applications of the vehicle. In other embodiments, the control management component 602 can further control specific subsets of the vehicle features, functionalities, and/or applications that can be accessed and controlled by an auxiliary device 102 and/or user. In accordance with these embodiments, the control management component 602 can include security component 604 to facilitate ensuring only authorized auxiliary devices and/or users of the auxiliary devices can connect to the vehicle and/or access and/or remotely control one or more electronic features, functionalities and/or applications of the vehicle.

In various embodiments, the security component 604 can facilitate identifying auxiliary devices and/or users of auxiliary devices that initiate connecting to the vehicle and/or that initiate usage of the remote-control application 116 to remotely control and/or access one or more features, functionalities and/or applications of the vehicle. The security component 604 can further determine whether the identified auxiliary devices and/or users are authorized to connect to the vehicle and/or use the remote-control application to remotely control/access the vehicle. The security component 604 can further facilitate preventing and/or enabling connection of the auxiliary device to the vehicle and/or activation of the remote-control features and functionalities of the remote-control application 116 based on whether an auxiliary device and/or user is authorized. The security component 604 can also employ a mechanism to verify the identities of the auxiliary devices/and/or users.

For example, in some embodiments, the remote-control application can access preconfigured remote-control management information (e.g., defined in memory 110, provided in a remote databased or system, or another suitable accessible location) identifying auxiliary devices and/or users of the auxiliary devices that are authorized to connect to the vehicle for the purpose of performing remote-control of the vehicle. For example, authorized auxiliary devices and/or users can be identified by a unique identifier (e.g., serial number, phone number, name, username, etc.) which can be provided to the security component 604 or otherwise determined by the security component 604. With these embodiments, the security component 604 can prevent unauthorized devices and/or users from connecting to the vehicle, and/or prevent unauthorized devices and/or users from employing the features and functionalities of the remote-control application 600 to remotely control and/or access features/functionalities/applications of a vehicle.

For example, in one implementation, if the security component 604 determines that a particular auxiliary device and/or user of the auxiliary device is not authorized to use the remote-control application 600 to remotely control/access features of a particular vehicle, the security component 604 can direct the communication unit 104 and/or communication unit 406 to disable or otherwise prevent connection establishment between the auxiliary device 102 and the vehicle computing device 402. In another implementation, if the security component 604 determines that a particular auxiliary device and/or user of the auxiliary device is not authorized to use the remote-control application 600 to remotely control/access features of a particular vehicle, the security component 604 can prevent the remote-control application from opening at the auxiliary device 102 or otherwise direct the remote-control component 506 to disable or deactivate features and functionalities of the remote-control application 600 that provide for accessing and controlling features/functions/applications of the vehicle.

The security component 604 can employ various suitable authentication techniques to verify identities of authorized auxiliary devices and/or users of the auxiliary devices. For example, in some embodiments, the control management component 602 can require users to register or establish personal user accounts wherein the users are identified by a unique user account name/identity. With these implementations, the security component 604 can identify a particular user of the remote-control application based on their user account name/identity. The security component 604 can further employ a suitable mechanism to authenticate users prior to allowing them access to remote-control functionality for a particular vehicle afforded by the remote-control application 600. For example, the security component 604 can require users to log in to their accounts using a secret password, passcode, etc. to verify their identifies. According to this example, based on successful login and a determination that the user account is authorized to remotely control/access the vehicle features/functions/applications, the security component 604 can direct the remote-control component 506 to enable the remote-control/access functionality afforded by the remote-control application 600.

In various alternative embodiments, with reference again briefly to FIG. 4, the vehicle computing device 402 can facilitate ensuring only authorized auxiliary devices and/or users of the auxiliary devices can connect to the vehicle 120. With these embodiments, one or more features and functionalities of the security component 604 can be executed by the vehicle computing device 402. For example, the communication unit 406 can employ a suitable security mechanism to ensure only authorized devices are allowed to connect with the vehicle computing device 402 and thus initiate a remote-control session with the vehicle computing device. For instance, the communication unit 406 can employ an existing wireless communication protocol (e.g., BLUETOOTH® technology, Wi-Fi technology, etc.) that maintains a list of devices that are paired with the vehicle computing device 402 or otherwise authorized to connect to the vehicle computing device 402. According to this example, the communication unit 406 can allow only paired/authorized devices to connect to the vehicle computing device 402.

In some embodiments, based on connection of an authorized auxiliary device and/or user of the auxiliary device to the vehicle and/or a determination that a connected auxiliary device and/or user of the connected auxiliary device is authorized to remotely access and/or control vehicle features, functionalities and/or applications using the remote-control application 600, the security component 604 can direct the remote-control component 506 to activate the vehicle GUI displayed at the auxiliary device and enable remote-control of the vehicle using the vehicle GUI. In other embodiments, rather than allowing any connected and/or authorized auxiliary device and/or user to remotely access and/or control all available vehicle features, functions and/or applications, the specific "usage privileges" regarding what vehicle features, functions and/or applications a particular auxiliary device 102 and/or user can access and control can be regulated and restricted based on defined conditions. For example, usages privileges regarding specific vehicle features, functions and/or applications a particular auxiliary device 102 and/or user can be allowed to remotely access and/or control can vary from user to user based on preferences of an owner or operator of the vehicle. Usage conditions regarding when an auxiliary device/user can remotely control/access certain vehicle features, functions and/or applications can also vary based on a context of the vehicle, a location of the auxiliary device 102, and the like. With these embodiments, the remote-control application 600 can include (e.g., stored in memory 110) or otherwise have access to remote-control management information that further defines conditions surrounding the specific vehicle functions and/or applications that particular auxiliary devices and/or users are authorized to access and/or control, and conditions surrounding when (e.g., contextual conditions) the auxiliary devices and/or users can establish control those specific vehicle functions and/or applications.

For example, in addition to defining what auxiliary devices/users can remotely connect to, access, and/or control a vehicle, the remote-control management information can further provide rules and regulations regarding what specific vehicle functions/applications an external device/user can access and/or control. For example, a driver of a vehicle may allow child passengers to access a music application of the vehicle but deny them access to controls for operating the electric windows. The remote-control management information can further provide rules and regulations regarding contextual conditions and/or scenarios that control when to enable/disable remote-control functionality and what specific vehicle functions/applications can be accessed/controlled by certain auxiliary devices/users under different contextual conditions and/or scenarios. For example, some different contextual conditions and/or scenarios can be based on but are not limited to: a driving mode or mobility state of the vehicle (e.g., on/off, in park, in drive, in neutral, in reverse, manual, automatic, etc.), a vehicle speed, a vehicle location, a vehicle route, a vehicle status (e.g., normal, emergency state, broken down, collision state, etc.) a time of day, current traffic levels, current weather, and the like. For instance, to minimize distraction to the driver in scenarios in which traffic conditions are high, weather conditions are hazardous, and the like, remote-control functions for controlling vehicle music system by auxiliary devices can be disabled. In another example, in a situation in which the vehicle is in a parked state, an auxiliary device operated by an authorized user can be temporarily allowed to control the vehicle locking system (e.g., a rear door child lock mechanism) using a connected external device. Some additional contextual factors that can be used to control enablement/disablement of remote-control of certain vehicle functions/applications can include for the example, number and identity of other passengers in the vehicle, identity of vehicle driver (e.g., different drivers can apply different remote-control privilege preferences) number of remote-control sessions established with the vehicle, and specific external devices/users with established remote-control sessions.

In another example, the specific vehicle functions/applications that can be remotely accessed and controlled by an auxiliary device using the remote-control application 600 can be based on a location of the auxiliary device relative to the vehicle. For example, the specific vehicle functions/applications that can be remotely accessed and controlled by an auxiliary device can be based on a particular location of the auxiliary device within the vehicle (e.g., the front passenger seat, the back seat, etc.). In other embodiments, one or more of the vehicle features and functionalities that can be accessed and controlled using the remote-control application 600 can be enabled when the auxiliary device is located outside the vehicle (e.g., connected to the vehicle via a wireless communication network, such as the Internet or another suitable network). For example, remote-controls of certain functions and/or applications of the vehicle can be disabled (e.g., by the remote-control component 506) based on movement of a connected auxiliary device outside of the vehicle while other functions/or applications can be enabled. In some implementations, the specific vehicle features, functions, and/or applications that can be remotely controlled/accessed using the remote-control application 600 can also be restricted based on a distance between the auxiliary device 102 away from the vehicle 120. For example, the remote-control component 506 can enable/ disable certain vehicle functions/controls based on the external device being over or under a defined distance from the vehicle (e.g., enable the external device with a remote-control locking/unlocking mechanism of the vehicle if within X feet of the vehicle, and the like). The specific vehicle functions/applications that can be remotely accessed and controlled by an auxiliary device 102 can also be based on dimensions of the display screen of the external device, the operating capabilities of the external device, and the like.

In some embodiments, the remote-control management information can be applied by the remote-control component 506 to control activating and deactivating remote-control/access of one or more vehicle functions/applications via the vehicle GUI displayed at the auxiliary device 102. For example, based on connection of an auxiliary device 102 to the vehicle and/or opening of the remote-control application 600, the remote-control component 506 can examine the remote-control management information and determine what specific vehicle features, functions and/or applications the auxiliary device and/or user of the auxiliary device is authorized to access and/or remotely control. In implementations in which the remote-control management information further defines contextual conditions regarding when certain vehicle features/functions can be accessed and/or controlled by the auxiliary device/user, the remote-control component 506 can also determine and select the specific vehicle functions/applications the auxiliary device/user is authorized to access/control based on any contextual restrictions defined by the remote-control management information. The remote-control component 506 can further activate the corresponding graphical control components as included in the vehicle GUI. The remote-control management information can also be employed by the display component 504 to facilitate configuring and/or adapting a vehicle GUI and/or a representation of the vehicle GUI as displayed at an auxiliary device. For example, in some implementations, the display component 504 can visually distinguish graphical elements for vehicle applications/functions that are activated for remote-control and those which are disabled (e.g., via greying icons for disabled functions/applications). In other implementations, the display component 504 can exclude graphical elements for vehicle applications/functions that are not authorized for remote-control by the external device.

In other embodiments, the control management component 602 can include selection component 606 to facilitate selecting, based on the remote-control management information, specific vehicle applications and/or functions to provide to an auxiliary device 102 via a GUI displayed at the auxiliary device 102 and to enable remote-control thereof via the GUI. In this regard, in association with connection of an auxiliary device 102 to the vehicle, opening of the remote-control application 600 to remotely control/access feature and functionalities of the vehicle, and/or a request to use the remote-control application to remotely control/access one or more features and functionalities of the vehicle, the selection component 606 can examine the remote-control management information to determine what specific vehicle functions/applications the auxiliary device 102 (or a user of the auxiliary device) is authorized to access/control. The selection component 606 can also consider one or more contextual conditions associated with the remote-control session to further determine and select the specific vehicle functions/applications the auxiliary device is authorized to access/control based on any contextual restrictions defined by the remote-control management information. The selection component 606 can further direct the display component 504 to include the selected vehicle functions/applications (e.g., graphical elements for the selected vehicle functions/applications) in the vehicle GUI rendered at the auxiliary device, and/or direct the remote-control component 506 to enable remote-control of the selected vehicle functions/applications by the external device through the GUI.

In accordance with embodiments in which the enablement/disablement of remote-control of certain vehicle functions/application can vary based on contextual factors/scenarios, the remote-control application 600 can include context monitoring component 608 to monitor and determine contextual parameters (e.g., those noted above and similar contextual parameters) in association with operation of the vehicle to facilitate enabling/disabling remote-control functionality for an auxiliary device accordingly. For example, the context monitoring component 608 can determine contextual information regarding but not limited to: a driving mode or mobility state of the vehicle (e.g., on/off, in park, in drive, in neutral, in reverse, manual, automatic, etc.), a vehicle speed, a vehicle location, a vehicle route, a vehicle status (e.g., normal, emergency state, broken down, collision state, etc.) a time of day, current traffic levels, current weather, number and identity of other passengers in the vehicle, identity of vehicle driver (e.g., different drivers can apply different remote-control privilege preferences) number of auxiliary device connected to the vehicle, and specific auxiliary devices/users with established remote-control sessions, location of the auxiliary device 102, and the like. In this regard, as the context parameters change over a course of an active remote-control session between an auxiliary device and the vehicle computing device 402, the selection component 606 can dynamically determine what specific vehicle features, function and/or applications to provide, activate and/or deactivate remote-control of for a particular auxiliary device and/or user of the auxiliary device, and respond accordingly (e.g., by directing the display component 504 to include or remove the corresponding functions/application from the GUI rendered at the external device, and/or by directing the remote-control component 506 to activate or deactivate remote-control of the corresponding functions/applications using the GUI). Thus, in some embodiments, the selection component 606 can facilitate dynamically adapting the appearance of the GUI and/or activation and deactivation of remote-control functions at an auxiliary device based on changes in context.

Figure 7A:
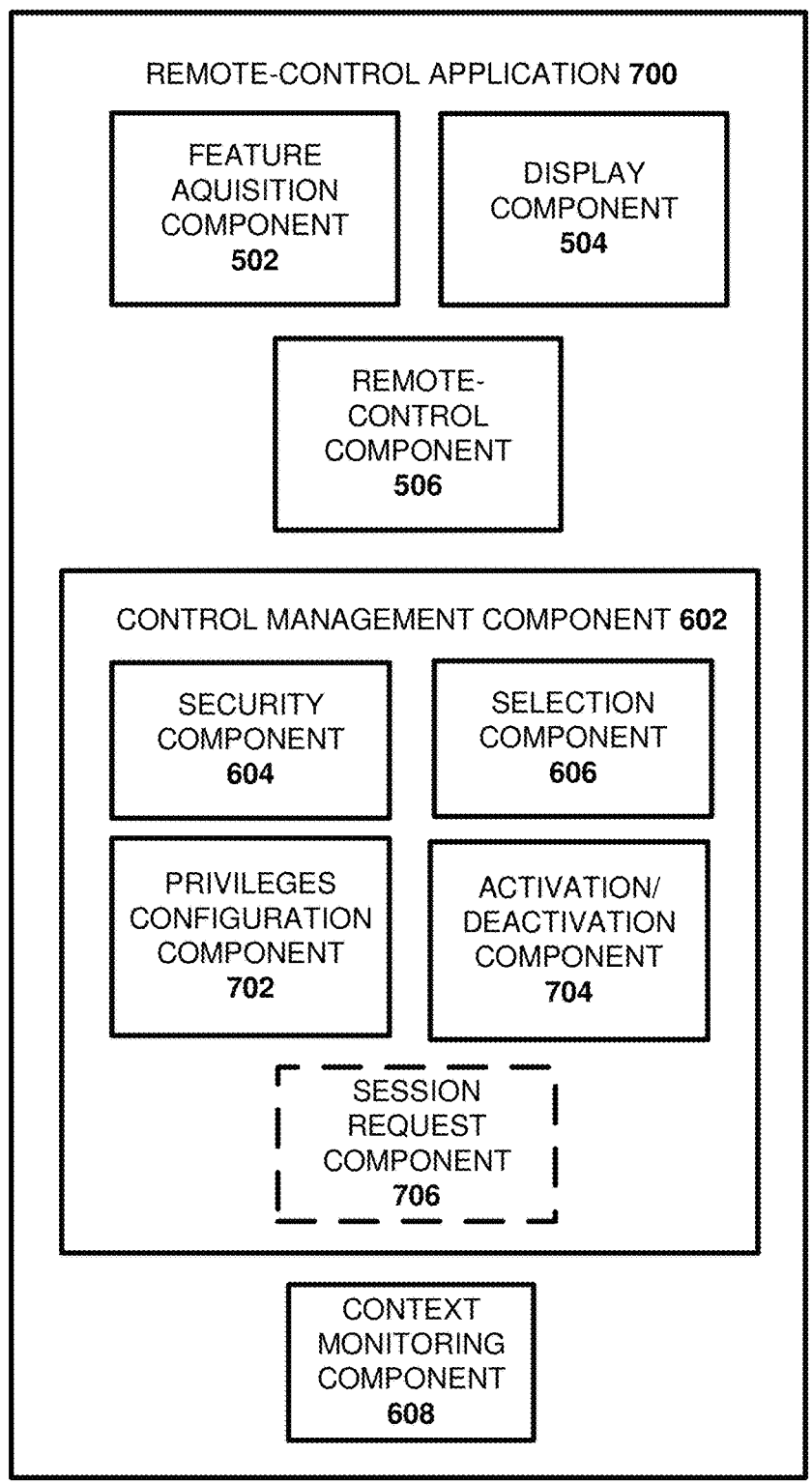
FIGS. 7A and 7B illustrate block diagrams of an example, non-limiting remote-control application that facilitates remotely controlling functions by a plurality of connected auxiliary devices in accordance with one or more embodiments of the disclosed subject matter.
Figure 7B:
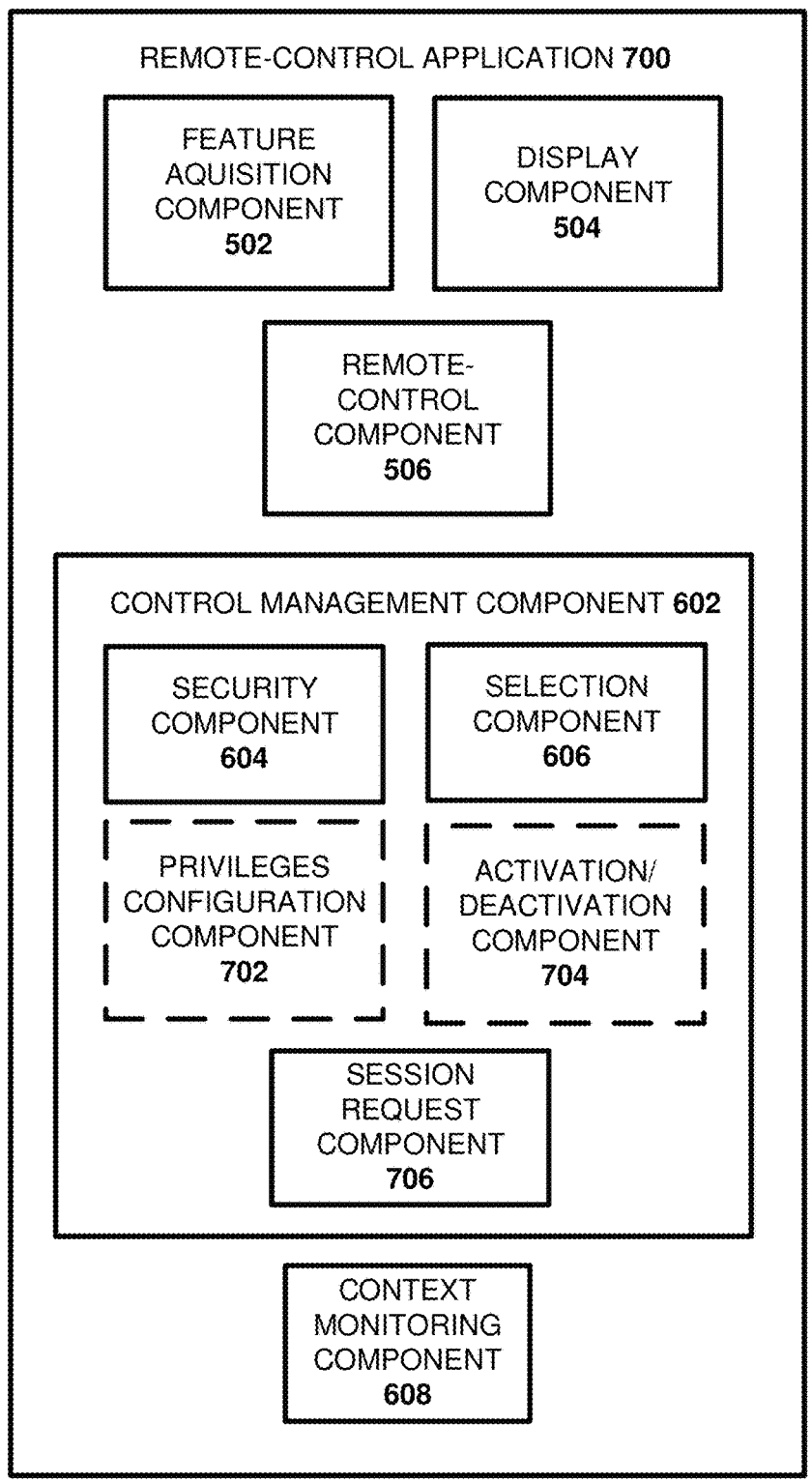

FIGS. 7A and 7B illustrate a block diagram of an example, non-limiting, remote-control application 700 that facilitates remotely controlling functions by a plurality of connected auxiliary devices in accordance with one or more embodiments of the disclosed subject matter. In various embodiments, two or more auxiliary devices can be connected to a vehicle at the same time and respectively be configured with remote-control applications to remotely control one or more features of the vehicle. With these embodiments, one auxiliary device can be assigned the role of primary control, also referred to herein as the "master," while the other auxiliary device or devices can be assigned the role of secondary control, also referred to herein as a "slave." The master auxiliary device can provide various features and functionalities that facilitate regulating and managing remote-control of the vehicle by the one or more slave auxiliary devices. For example, in some implementations, the master auxiliary device can control what additional auxiliary devices/users can access and remotely control the vehicle features/functions. The master auxiliary device can also control the specific vehicle functions/applications that can be controlled by each additional auxiliary device, contextual conditions surrounding when the additional slave devices can control certain vehicle functions/applications, and the like. In this regard, the auxiliary device designated as the master can include a remote-control application that provides some additional features and functionalities that facilitate managing and regulating usage of a remote-control application by one or more additional auxiliary devices designated as secondary or slave devices. Likewise, an auxiliary device designated as a slave device can include a remote-control application that provides one or more additional features and functionalities that provide for operating in accordance with management functions provided by the master auxiliary device.

In various embodiments, a same remote-control application can provide both master device feature/functionalities and slave device features/functionalities. With these embodiments, the slave device features/functions can be deactivated in implementations in which the auxiliary device/user of the remote-control application is designated as the master. Likewise, the master device features/functions can be deactivated in implementations in which the auxiliary device/user of the remote-control application is designated as a slave. For example, in some implementations, respective users can be associated with individual user accounts in association with usage of the remote-control application. With these implementations, one user account can be designated as a master user account and be enabled with the additional features and functionalities that provide for managing and regulating usage of instances of the remote-control application by user accounts/auxiliary devices designated as slaves. Likewise, instances of the remote-control application executed by user accounts/auxiliary devices designated as slaves can be enabled with additional features and functionalities that provide for operating in accordance with control features/functions performed by the master.

In this regard, FIGS. 7A and 7B depicts an example remote-control application 700 with a control management component 602 that provides additional features and functionalities the facilitate usage of the remote-control application as either a master or a slave. In the embodiments shown, the additional features and functionalities associated with the master are afforded by privileges configuration component 702, the activation/deactivation component 704, and the additional features and functionalities associated with the slave are afforded by the session request component 706. In this regard, FIG. 7A depicts the session request component 706 using a dashed box to indicate that the session request component 706 can be deactivated when the remote-control application 700 is being used as the master. For example, in some implementations in which a specific user account or is designated as the master, based on signing into or logging into their account using the remote-control application 700 and a determination by the control management component 602 that the user is designated with authority as a master, the control management component 602 can activate or otherwise enable the privileges configuration component 702 and/or the activation/deactivation component 704 and deactivate or disable the session request component 706. Likewise, FIG. 7B depicts the privileges configuration component 702 and the activation/deactivation component 704 with dashed boxes to indicate the depicts the privileges configuration component 702 and the activation/deactivation component 704 can be deactivated in instances in which the remote-control application is being used as a slave. In this regard, based on a determination by the control management component 602 that an auxiliary device/user account implementing the remote-control application 700 is designated as a slave, the control management component 602 can activate or otherwise enable the session request component 706 and deactivate or disable the privileges configuration component 702 and/or the activation/deactivation component 704. In various embodiments, an auxiliary device 102 of the disclosed systems (e.g., system 100, system 400 and the like) can include remote-control application 700, remote-control application 600, or remote-control application 116. Repetitive description of like elements employed in respective embodiments is omitted for sake of brevity.

With reference to FIG. 7A, the privileges configuration component 702 can allow a user of the master auxiliary device/user account to define the remote-control management information for a vehicle. For example, as discussed above, the remote-control management information can include information defining authorized auxiliary devices and/or users (e.g., user accounts) allowed to connect to the vehicle or otherwise employ a remote-control application (e.g., remote-control application 700) to remotely control the vehicle, information defining specific vehicle functions and/or applications the respective authorized auxiliary devices and/or users can access/control, and information defining contextual conditions and/scenarios that control timing of enablement/disablement of specific vehicle functions/applications. In this regard, the privileges configuration component 702 can allow the user of the master auxiliary device/user account to define and/or set rules regarding what auxiliary devices and/or users can establish a remote-control session with the vehicle 120, what additional auxiliary devices and/or users can employ the remote-control application 700 as a slave to remotely access and/or control electronic features, functions and/or applications of the vehicle, one or more specific vehicle functions and/or applications the auxiliary devices/users are authorized to access and/or control, and conditions surrounding when (e.g., contextual conditions) the auxiliary devices and/or users can remotely access and/or control specific vehicle functions/applications.

In various embodiments, the privileges configuration component 702 can receive and apply user input defining or setting one or more aspects of the remote-control management information. In some embodiments, the privileges configuration component 702 can further cause the other "slave" auxiliary devices and/or instances of the remote-control application 700 deployed at the other auxiliary devices to apply the remote-control management information defined by the master. For example, the privileges configuration component 702 send or otherwise provide the remote-control management information to the slave auxiliary devices and/or instances of the remote-control application 700. The control the instance of remote-control application 700 executed by the slave devices can further be configured to apply (e.g., by the display component 504, the remote-control component 506, the security component 604 and/or the selection component 606) the received, "master defined," remote-control management information in accordance with the techniques described herein.

In some embodiments, the master auxiliary device/user account can also control activation/deactivation of one or more remote-control features and functionalities of the slave auxiliary devices based on transmission of activation/deactivation commands by the master auxiliary device/user account. For example, in some embodiments, the activation/deactivation component 704 can require slave auxiliary devices to send the master auxiliary device a request to perform a remote-control session with the vehicle or otherwise use their remote-control application 700 to remotely control/access one or more features and functionalities of the vehicle. With these embodiments, with reference to FIG. 7B, in association with a slave auxiliary device connecting to the vehicle and/or opening of the remote-control application 700 at the slave auxiliary device, the session request component 706 can send the master auxiliary device a request to initiate a remote-control session with the vehicle. Based on reception of the request, the activation/deactivation component 704 can determine (e.g., using the security component 604) whether the slave auxiliary device/user account is authorized to remotely control the vehicle (e.g., based on the control management information). For example, the activation/deactivation component 704 can determine whether the auxiliary device/user account is listed as an authorized device to remotely control the vehicle, to control the vehicle under the current context (e.g., based on an operating state of the vehicle, based on a number of other connected devices, and the other various contextual parameters discussed herein), and the like. If the auxiliary device/user is authorized, the activation/deactivation component 704 can respond to the request by sending the slave auxiliary device/user account a message granting the request. Likewise, if the auxiliary device/user account is unauthorized, the activation/deactivation component 704 can respond to the request by sending the slave auxiliary device/user a message denying the request. The remote-control application of the slave auxiliary device/user account can further be configured to activate and/or deny activation (e.g., using the remote-control component 506) of the remote-control capabilities of the remote-control application for the vehicle based on whether the received response grants or denies the request.

In some embodiments, in association with sending a response to a remote-control session request granting a slave auxiliary device/user account authorization to use the remote-control application 700 to remotely control/access a vehicle electronic features, functions and/or applications, the response can define specific parameters or conditions of the usage privileges granted to the slave auxiliary device/user account defined by the remote-control management information. For example, the response can include information defining the specific usage permissions granted to the auxiliary slave device/user account, such as what specific vehicle functions/features the slave auxiliary device can and can't remotely control/access, contextual conditions surrounding when the slave auxiliary device can and can't use certain features of the vehicle using the remote-control application 700 and the like. In this regard, the response message can include the remote-control management information defined for that auxiliary device/user account. The remote-control application 700 of the slave auxiliary device that receives the response can further be configured to apply the remote-control management information receive in the response (e.g., using the remote-control component 506).

In various additional embodiments, the activation/deactivation component 704 can also control activation and deactivation of one or more features and functionalities of a remote-control application 700 being used at a slave auxiliary device in real-time. For example, in one implementation, after a slave auxiliary slave device has connected to the vehicle or otherwise established an active remote-control session with the vehicle, the activation/deactivation component 704 can send activation/deactivation commands to the slave auxiliary device based on changes in context of the vehicle, based on changes in location of the slave auxiliary device, and the like (e.g., determined based on the context information generated by the context monitoring component 608). In this regard, if the context of the vehicle and/or slave auxiliary device changes and the control management information warrants activation or deactivation of one or more remote-control capabilities of the remote-control application 700 at the slave auxiliary device based on the changes to the context, the activation/deactivation component 704 can send an activation or deactivation command to the slave auxiliary device directing the slave auxiliary device to activate or deactivate the appropriate remote-control capabilities. The remote-control component 506 of the remote-control application at the slave auxiliary device can further be configured to respond accordingly and activate or deactivate the appropriate remote-control capabilities as identified in the activation/deactivation command. In other embodiments, the activation/deactivation component 704 can allow a user of the master device to initiate sending of activation/deactivation commands to slave auxiliary devices at will. For example, the activation/deactivation component 704 can receive user input identifying a slave device/user account and defining the specific features and functionalities of the remote-control application of the slave device/user account to activate or deactivate (e.g., activate or deactivate all remote-control capabilities, activate or deactivate remote-control of only the music system, etc.). The activation/deactivation component 704 can further send the activation/deactivation command to the slave device/user account at the direction of the user of the master device (e.g., in response to user input at the master auxiliary device requesting to send the deactivation command).

In some implementations, the display component 504 can provide a "selective presentation mode" that allows the slave auxiliary device/user account to control what is displayed on the display 106 or display of the master auxiliary device. In particular, when using the selective presentation mode in association with an active remote-control session, a user of a slave auxiliary device can send a request to the master auxiliary device directing the master auxiliary device to display a particular GUI page, open a particular vehicle application and render the corresponding GUI for that application, run a particular vehicle application and render the corresponding GUI for that application, and the like. For example, in association with the usage of the selective presentation mode, the remote-control component 506 of a slave auxiliary device that is connected to the vehicle (e.g., the vehicle computing device 402 of the vehicle) can access a navigation application of the vehicle (e.g., of the one or more other vehicle applications 418). Using the application, a user of the slave auxiliary device can further set up a navigation route for the vehicle. After the user has set up a desired navigation route, the user can further direct the navigation application to execute the navigation route and direct the touchscreen or display of the master auxiliary device to display the live map corresponding to the route. The display component 504 of the master auxiliary device can further cause the display 106 (or other display) of the master auxiliary device to display the navigation application and the corresponding route at the direction of the external device without the driver having to do anything except granting access.

FIG. 8 illustrates a block diagram of an example, non-limiting system 800 that facilitates remotely controlling functions of a vehicle by a plurality of connected auxiliary devices in accordance with one or more embodiments of the disclosed subject matter. System 800 provides same or similar features and functionalities as system 100 and system 400 with the addition of one or more additional auxiliary devices 802 that can be connected to the vehicle 120 in addition to auxiliary device 102. In this regard, system 800 provides an example system in which one auxiliary device (e.g., auxiliary device 102) includes remote-control application 700 as the master and one or more additional auxiliary devices 802 include remote-control application 700 and function as slaves. The one or more additional auxiliary devices 802 can include same or similar components as auxiliary device 102. In this regard, although various components of the auxiliary device 102 are not depicted (e.g., the communication unit 104, the display 106, the memory 110, the at least one processing unit112, etc.), it should be appreciated that the auxiliary device 102 and the one or more additional auxiliary devices 802 include these components, and that their exclusion from the diagram is merely for ease of explanation. Repetitive description of like elements employed in respective embodiments is omitted for sake of brevity.

In accordance with system 800, the one or more additional auxiliary devices 802 can be connected to the (master) auxiliary device 102, via wired (e.g., via a USB cable or auxiliary cable) or wireless connection (e.g., using BLUETOOTH®, NFC, using Wi-Fi, using the Internet, using a cellular network, etc.). In some embodiments, the one or more additional auxiliary devices 802 can also be directly connected to the vehicle electronic systems/devices 118 (e.g., or more particularly to the ECUs of the one or more vehicle electronic systems/devices, the vehicle computing device 402 and/or the one or more control unit 416) via wired or wireless connection. In other embodiments, the one or more additional auxiliary devices 802 can be indirectly connected to the vehicle electronic systems/devices 118 via the (master) auxiliary device 102. With these embodiment, the one or more additional auxiliary devices 802 can be connected to the vehicle electronic systems/devices 118 in an ad hoc manner whereby the (master) auxiliary device 102 relays control commands from the one or more additional auxiliary devices 802 to the vehicle 120 and vice versa.

Figure 9:
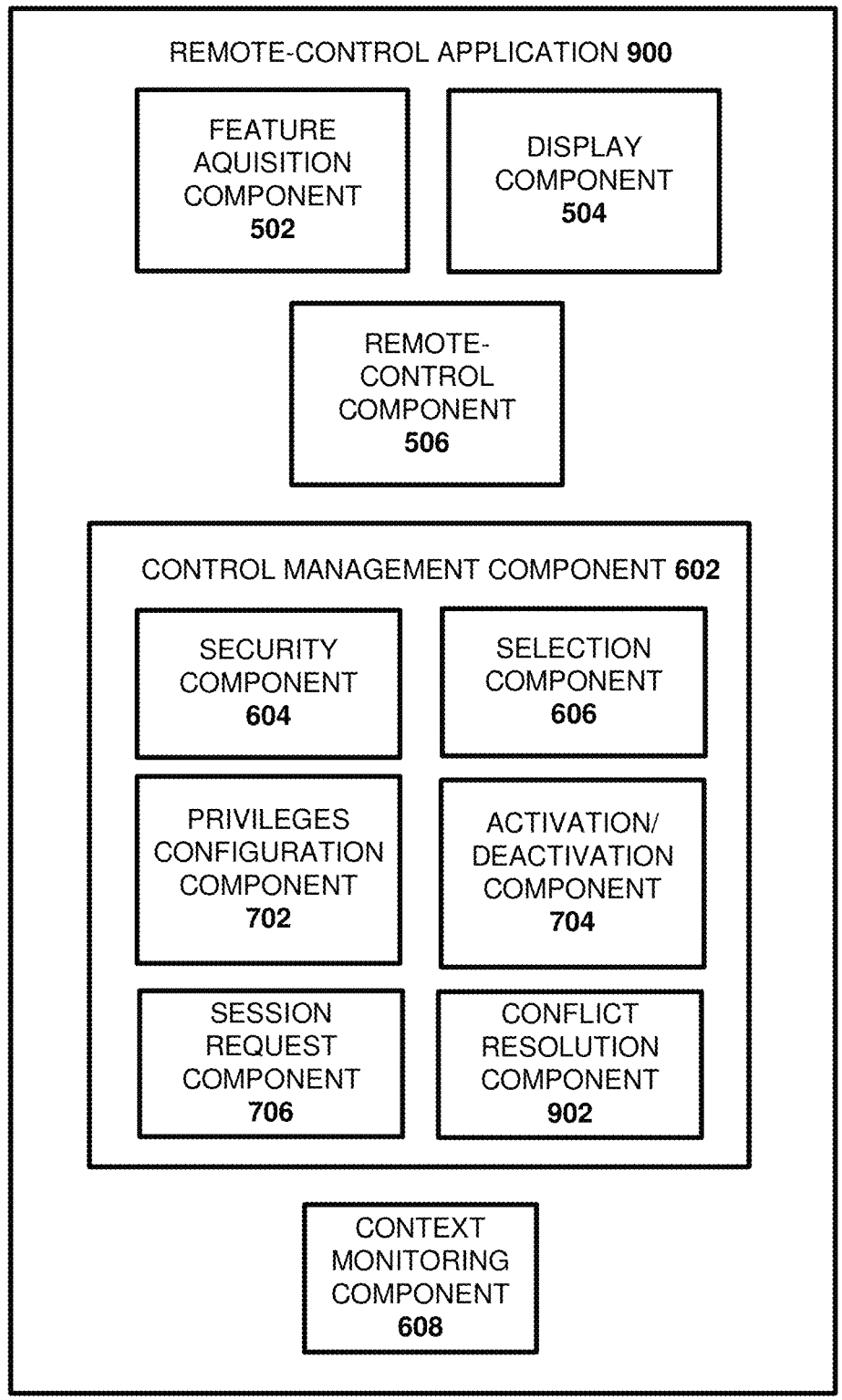
FIG. 9 illustrates a block diagram of another example, non-limiting remote-control application that facilitates remotely controlling functions by a plurality of connected auxiliary devices in accordance with one or more embodiments of the disclosed subject matter.

FIG. 9 illustrates a block diagram of another example, non-limiting, remote-control application 900 that facilitates remotely controlling functions by a plurality of connected auxiliary devices in accordance with one or more embodiments of the disclosed subject matter. Remote-control application 900 includes same or similar features and functionalities as remote-control application 700 with the addition of conflict resolution component 902. In various embodiments, an auxiliary device (e.g., auxiliary device 102, the one or more additional auxiliary devices 802, and the like) of the disclosed systems (e.g., system 100, system 400, system 800 and the like) can include remote-control application 900, remote-control application 700, remote-control application 600, or remote-control application 116. Repetitive description of like elements employed in respective embodiments is omitted for sake of brevity.

As discussed above with reference to FIGS. 7A, 7B and 8, in some embodiments, two or more auxiliary devices can be connected to the vehicle at the same time, thereby enabling simultaneous remote-control of the vehicle electronic features, functions and/or applications by two or more devices. With these implementations, scenarios can arise in which conflicting control commands are received (e.g., by an ECU of a vehicle electronic system/device, by a vehicle application, etc.) from two or more different auxiliary devices at or near the same time. Thus, in one or more embodiments, a remote-control application 900 of the auxiliary device/user account designated as the master can include a conflict resolution component 902 that resolves conflicting control commands for controlling a function or application received from two or more devices. With these embodiments, the master auxiliary device can be configured to intercept control commands sent by slave auxiliary devices to the vehicle 120 and forward the control commands to the vehicle 120. The slave auxiliary devices can thus be connected to the vehicle in an ad-hoc manner wherein all commands sent by the slave auxiliary devices to the vehicle are intercepted by the master auxiliary device and forward to the vehicle. The conflict resolution component 902 can further resolve conflicts between two or more conflicting commands received at or near the same time (e.g., from two or more slave devices or from a slave device and input by a user of the master auxiliary device). In other embodiments, the vehicle computing device 402 can include the conflict resolution component 902 (not shown). With these embodiments, the vehicle computing device 402 can receive conflicting control commands from two or more auxiliary devices (e.g., which can include both the master auxiliary device and slave auxiliary devices) and determine one or of the conflicting control commands to apply.

In some embodiments, the conflict resolution component 902 can employ a predefined conflict resolution protocol that defines how to resolve conflicting commands received for controlling vehicle functions and/or applications. The predefined conflict resolution protocol can for example be provided by a system administrator or configured by an authorized entity, such as the driver of the vehicle. For example, in some implementations, the predefined conflict resolution protocol can define a hierarchy for control command sources such that commands received from a higher ranked source override a lower ranked source (e.g., master auxiliary device commands override all other devices, auxiliary device/user 1 commands override auxiliary device/user 2, and so on). The source hierarchy can apply to all vehicle functions/applications, or a specific source hierarchy can be assigned to respective vehicle functions/applications (e.g., for application A auxiliary device/user 1 commands override auxiliary device/user 2, for application B, auxiliary device/user 2 commands override auxiliary device/user 3, and so on and so on).

In other embodiments in which control commands are received from two or more auxiliary devices with a distinguishable time difference, even if the time difference is minimal (e.g., less than a one second difference), the conflict resolution component 902 can employ a first in time protocol, wherein the command received first wins. In some implementations of the first in time protocol, depending on the specific vehicle function or application, the conflict resolution component 902 can also apply a minimum threshold period before accepting and applying a new command to control the same vehicle function or application received from a different device. For example, assume a first auxiliary device and a second auxiliary device issue commands to change the vehicle music source to different sources near the same time and the first auxiliary device wins based on the first in time protocol. With this example, if the second auxiliary device attempts to issue an additional commend requesting again to change the music source within a defined period of time after the vehicle applied the control command of the first auxiliary device, the conflict resolution component 902 can reject the additional control command (e.g., in implementations in which the conflict resolution component is executed by the master auxiliary device), or direct the ECU responsible for the vehicle music system to reject the additional control command (e.g., in implementations in which the conflict resolution component 902 is executed by the vehicle computing device 402).

Figure 10:
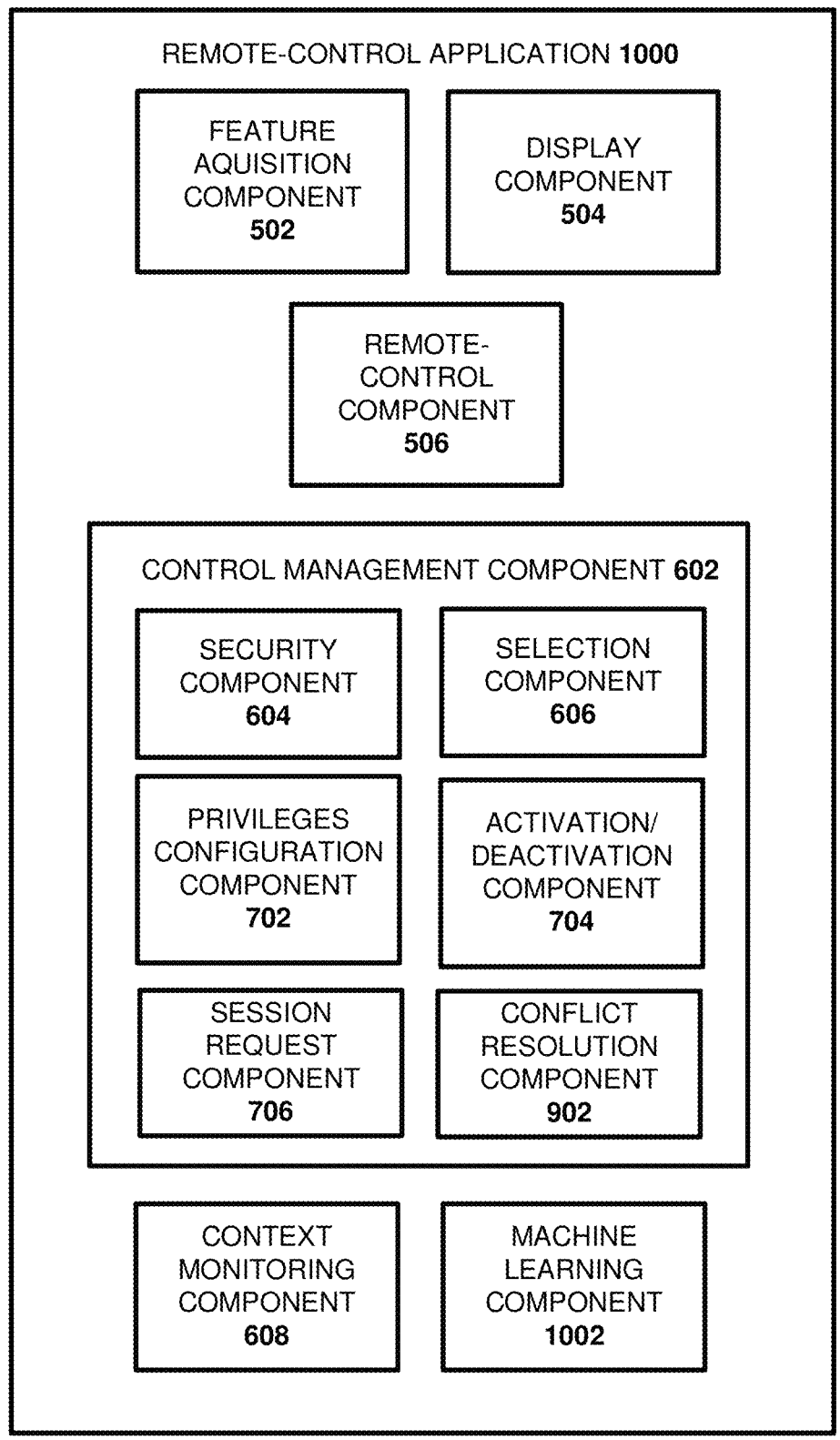
FIG. 10 illustrates a block diagram of another example, non-limiting remote-control application that facilitates remotely controlling functions of a vehicle without an integrated touchscreen in accordance with one or more embodiments of the disclosed subject matter.

FIG. 10 illustrates a block diagram of another example, non-limiting, remote-control application 1000 that facilitates remotely controlling functions of a vehicle without an integrated touchscreen in accordance with one or more embodiments of the disclosed subject matter. Remote-control application 1000 includes same or similar features and functionalities as remote-control application 900 with the addition of machine learning component 1002. In various embodiments, an auxiliary device (e.g., auxiliary device 102, the one or more additional auxiliary devices 802, and the like) of the disclosed systems (e.g., system 100, system 400, system 800 and the like) can include remote-control application 1000, remote-control application 900, remote-control application 700, remote-control application 600, or remote-control application 116. Repetitive description of like elements employed in respective embodiments is omitted for sake of brevity.

The machine learning component 1002 can employ artificial intelligence and one or more machine learning techniques to facilitate various features and functionalities of the remote-control application 1000. For example, in some embodiments, the machine learning component 1002 can learn information regarding specific auxiliary devices and/or users that are authorized or unauthorized to establish a remote-control session with a vehicle. The security component 604, the remote-control component 506 and/or the activation/deactivation component 704 can further employ the learned authorization information to automatically authorize or deny authorization of a remote-control session between an auxiliary device/user account and the vehicle. The machine learning component 1002 can further learn user preferences (e.g., specific to a driver of the vehicle or user of a master auxiliary device) regarding what vehicle applications and/or functions a specific auxiliary device and/or user account can access and when (e.g., in different contextual scenarios). The control management component 602 can further apply this learned privilege information to automatically select vehicle applications/functions to include in a GUI rendered at an auxiliary device (e.g., via selection component 606), and/or to automatically activate and deactivate at an instance of the remote-control application 1000 (e.g., by the remote-control component 506 and/or by the activation/deactivation component 704).

The machine learning component 1002 can also learn behavior of a user of an auxiliary device, including a master auxiliary device and a slave auxiliary device, regarding usage of the remote-control application, and more particular, the GUI provided by the display component 504 of the remote-control application 1000, to control vehicle features, functions, and/or applications in association with different contexts of the vehicle and/or auxiliary device. For example, the machine learning component 1002 can learn usage patterns regarding what vehicle features/functions the user accesses and remotely controls and when, frequency of use, order of use and the like. The display component 504 can further dynamically modify or adapt the graphical controls of the GUI based on the learned usage behavior. For example, the display component 504 can tailor the specific graphical controls for corresponding vehicle features/functions/application included in respective pages of the vehicle GUI displayed at the auxiliary device based on learned preferences of the user in different contexts. The machine learning component 1002 can also learn user preferences regarding how to resolve conflicting commands received from two or more devices. The conflict resolution component 902 can further apply the learned conflict resolution information to automatically determine how to resolve conflicts received from two or more devices.

In this regard, the machine learning component 1002 can perform classifications, correlations, inferences and/or expressions associated with principles of artificial intelligence. For instance, the machine learning component 1002 can employ an automatic classification system and/or an automatic classification. In one example, the machine learning component 1002 can employ a probabilistic and/or statistical-based analysis (e.g., factoring into the analysis utilities and costs) to learn and/or generate inferences. The machine learning component 1002 can employ any suitable machine-learning based techniques, statistical-based techniques and/or probabilistic-based techniques. For example, the machine learning component 1002 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 1002 can perform a set of machine learning computations. For example, the machine learning component 1002 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 11:
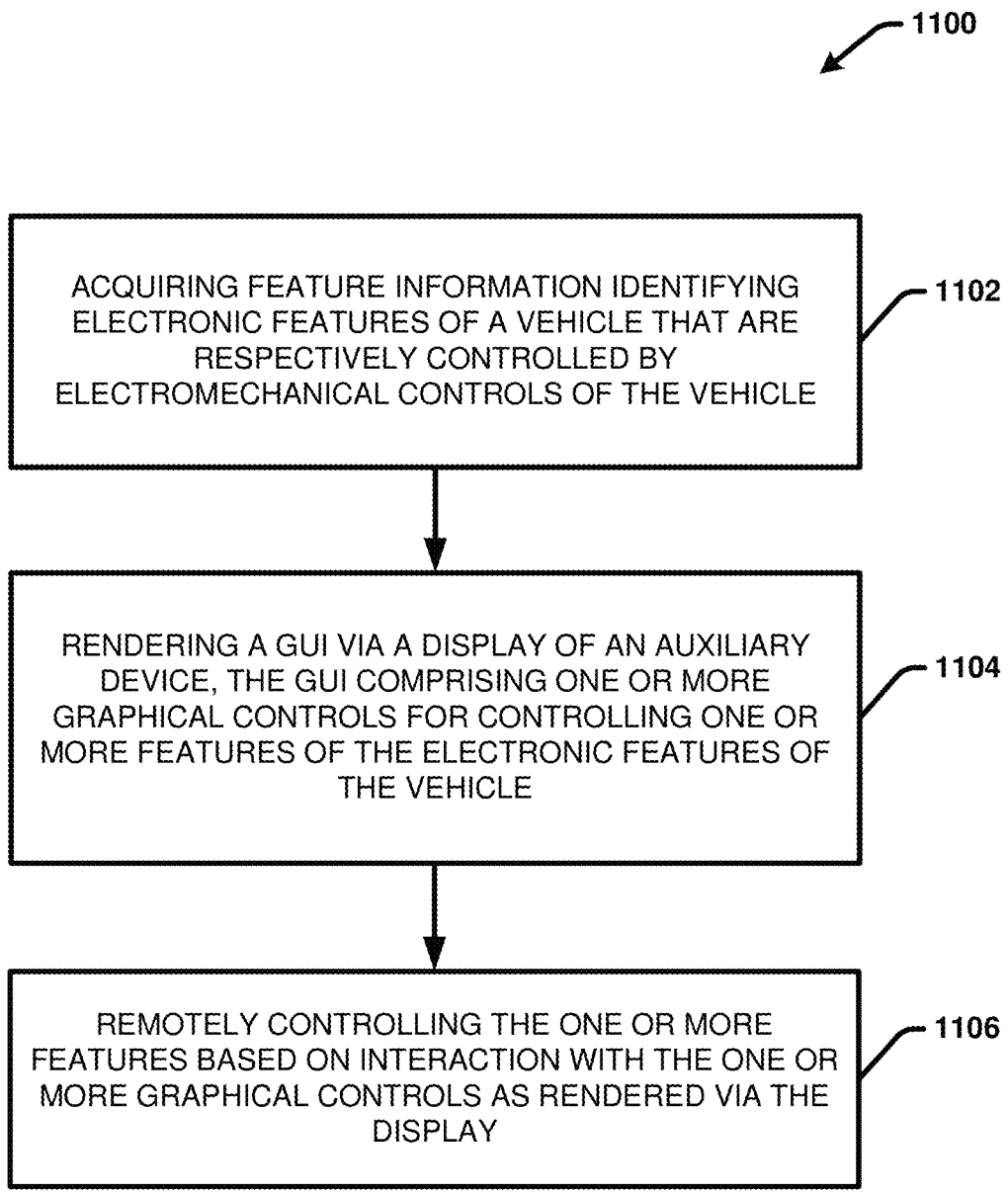
FIG. 11 provides a high-level flow diagram of an example computer-implemented process for remotely controlling functions of a vehicle without an integrated touchscreen in accordance with one or more embodiments of the disclosed subject matter.

FIG. 11 provides a high-level flow diagram of an example computer-implemented process 1100 for remotely controlling functions of a vehicle without an integrated touchscreen in accordance with one or more embodiments of the disclosed subject matter. One or more embodiments of method 1100 can be performed by an auxiliary device (e.g., auxiliary device 102) and/or a remote-control application of the auxiliary device (e.g., remote-control application 116, remote-control application 600, remote-control application 700, remote-control application 900, remote-control application 1000, or the like). Repetitive description of like elements employed in respective embodiments is omitted for sake of brevity.

At 1102 feature information can be acquired identifying electronic features of a vehicle that are respectively controlled by electromechanical controls of the vehicle (e.g., using feature acquisition component 502). At 1104, a GUI comprising one or more graphical controls for controlling one or more features of the electronic features of the vehicle can be rendered vi a display (e.g., display 106) of an auxiliary device (e.g., via display component 504). At 1106, the one or more features can be remotely controlled based on interaction with the one or more graphical controls as rendered via the display (e.g., via remote-control component 506).

Figure 12:
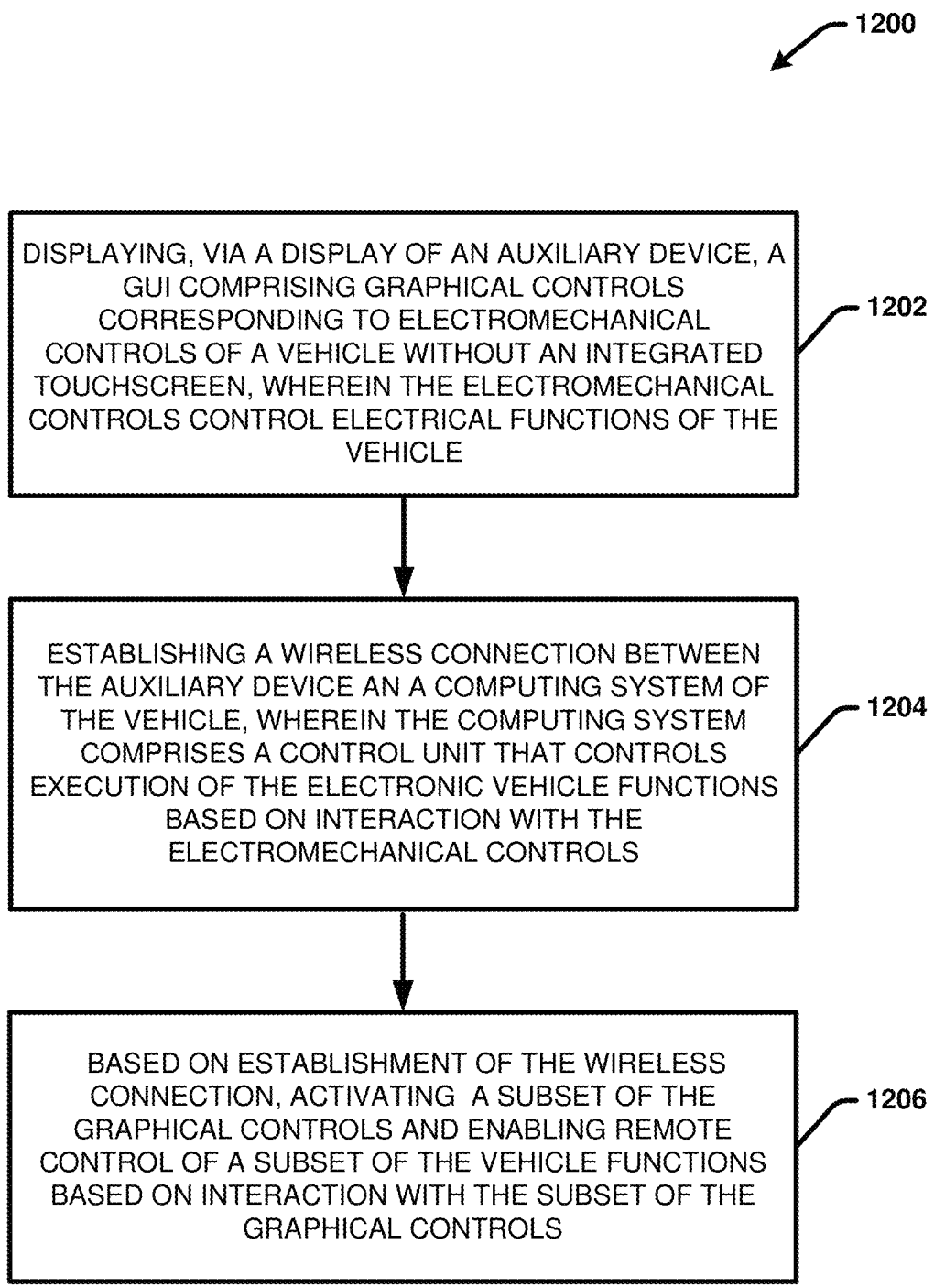
FIG. 12 provides a high-level flow diagram of another example computer-implemented process for remotely controlling functions of a vehicle without an integrated touchscreen in accordance with one or more embodiments of the disclosed subject matter.

FIG. 12 provides a high-level flow diagram of another example computer-implemented process 1200 for remotely controlling functions of a vehicle without an integrated touchscreen in accordance with one or more embodiments of the disclosed subject matter. One or more embodiments of method 1200 can be performed by an auxiliary device (e.g., auxiliary device 102) and/or a remote-control application of the auxiliary device (e.g., remote-control application 116, remote-control application 600, remote-control application 700, remote-control application 900, remote-control application 1000, or the like). Repetitive description of like elements employed in respective embodiments is omitted for sake of brevity.

At 1202, a GUI comprising graphical controls corresponding to electromechanical controls of a vehicle without an integrated touchscreen can be displayed via a display of an auxiliary device (e.g., using display component 504 and display 106), wherein the electromechanical controls control electrical functions of the vehicle. At 1204, a wireless connection can be established between the auxiliary device and a computing system of the vehicle, (e.g., using communication unit 104), wherein the computing system comprises a control unit that controls execution of the electrical functions based on interaction with the electromechanical controls. At 1206, based on establishment of the wireless connection, a subset of the graphical controls can be activated (e.g., by the remote-control component 506) and remote-control of a subset of the electrical functions can be enabled based on interaction with the subset of the graphical controls (e.g., using remote-control component 506).

Figure 13:
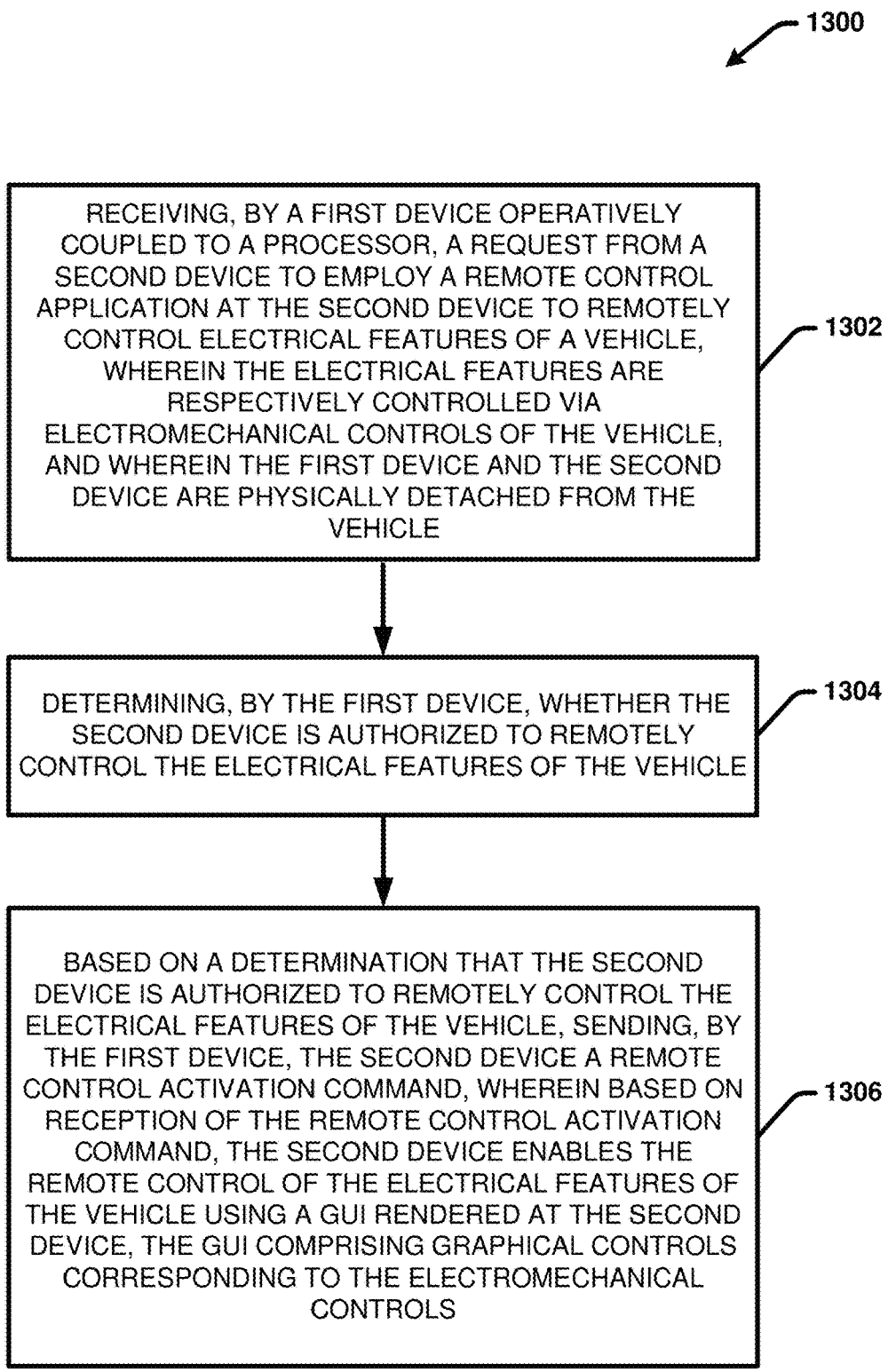
FIG. 13 provides a high-level flow diagram of another example computer-implemented process for remotely controlling functions of a vehicle without an integrated touchscreen in accordance with one or more embodiments of the disclosed subject matter.

FIG. 13 provides a high-level flow diagram of another example computer-implemented process 1300 for remotely controlling functions of a vehicle without an integrated touchscreen in accordance with one or more embodiments of the disclosed subject matter. One or more embodiments of method 1300 can be performed by an auxiliary device (e.g., auxiliary device 102) and/or a remote-control application of the auxiliary device (e.g., remote-control application 116, remote-control application 600, remote-control application 700, remote-control application 900, remote-control application 1000, or the like). Repetitive description of like elements employed in respective embodiments is omitted for sake of brevity.

At 1302, a first device operatively coupled to a processor (e.g., auxiliary device 102) can receive a request from a second device (e.g., an auxiliary device of the one or more additional auxiliary devices 802) to employ a remote-control application at the second device to remotely control electrical features of the vehicle, wherein the electrical features are respectively controlled via electromechanical controls of the vehicle, and wherein the first device and the second device are physically detached from the vehicle. At 1304, the first device can determine whether the second device is authorized to remotely control the electrical features of the vehicle (e.g., using security component 604). At 1306, based on a determination that the second device is authorized to remotely control the electrical features of the vehicle, the first device can send a remote-control activation command (e.g., using activation/deactivation component 704 and communication unit 104), wherein based on reception of the remote-control activation command, the second device enables (e.g., using remote-control component 506) the remote-control of the electrical features of the vehicle using a GUI rendered at the second device, the GUI comprising graphical controls corresponding to the electromechanical controls.

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. An auxiliary device that facilitates remotely controlling functions of a vehicle without an integrated touchscreen, comprising:
   a display;
   a processor that executes computer executable components stored in at least one memory the computer executable components comprising;
      a feature acquisition component that determines a set of electronic features of the vehicle that are respectively controlled by electromechanical controls of the vehicle;
      a selection component that selects a subset of electronic features from the set of electronic features of the vehicle based on a location of the auxiliary device relative to the vehicle and a second user identity of a second occupant of the vehicle, wherein the auxiliary device is associated with a first user identity of a first occupant of the vehicle;
      a display component that displays a graphical user interface via the display, wherein the graphical user interface comprises one or more graphical controls for controlling only the subset of electronic features of the of the vehicle;
      a connection component that facilitates establishing a connection between the auxiliary device and a control unit of the vehicle that activates remote-control functionality of the subset of electronic features using the one or more graphical controls; and
      a remote-control component that remotely controls the control unit of the vehicle to execute the subset of electronic features based on interaction with the one or more graphical controls.

2. The auxiliary device of claim 1, wherein the auxiliary device is physically detached from the vehicle.

3. The auxiliary device of claim 1, wherein the display comprises a touchscreen, and the one or more graphical controls comprise touch controls.

4. The auxiliary device of claim 1, wherein the selection component selects the subset of electronic features further based on usage privileges granted to the auxiliary device.

5. The auxiliary device of claim 1, wherein the selection component selects the subset of electronic features further based on context of the vehicle.

6. The auxiliary device of claim 1, wherein the selection component selects the subset of electronic features further based on a user of the auxiliary device.

7. The auxiliary device of claim 1, wherein the auxiliary device is a first auxiliary device and wherein the first auxiliary device further comprises:
   a privileges configuration component that facilitates defining usage privileges for enabling remote-control of the electronic features by one or more second auxiliary devices.

8. The auxiliary device of claim 1, wherein the auxiliary device is a first auxiliary device and wherein the first auxiliary device further comprises:
   an activation/deactivation component that controls activating and deactivating remote-control of the electronic features by one or more second auxiliary devices.

9. The auxiliary device of claim 1, further comprising:
   a machine learning component that learns behavior of a user of the auxiliary device in association with usage of the graphical user interface to remotely control the subset of electronic features and modifies the one or more graphical controls based on the behavior.

10. A computer-implemented method for remotely controlling features of a vehicle without an integrated touchscreen, comprising
    acquiring, by an auxiliary device comprising a processor, feature information identifying a set of electronic features of the vehicle that are respectively controlled by electromechanical controls of the vehicle;
    selecting, by the auxiliary device, a subset of electronic features from the set of electronic features of the vehicle based on a location of the auxiliary device relative to the vehicle and a second user identity of a second occupant of the vehicle, wherein the auxiliary device is associated with a first user identity of a first occupant of the vehicle;
    rendering a graphical user interface via a display of the auxiliary device, the graphical user interface comprising one or more graphical controls for controlling only the subset of electronic features of the vehicle;
    establishing, by the auxiliary device, a connection between the auxiliary device and a control unit of the vehicle that activates remote-control functionality of the subset of electronic features using the one or more graphical controls; and
    remotely controlling the control unit of the vehicle to execute the subset of electronic features based on interaction with the one or more graphical controls.

11. The method of claim 10, wherein the display comprises a touchscreen, and the one or more graphical controls comprise touch controls.

12. The method of claim 10, wherein the selecting the subset of electronic features is further based on usage privileges granted to the auxiliary device or a user of the auxiliary device.

13. The method of claim 10, wherein the selecting the subset of electronic features is further based on a context of the vehicle.

14. The method of claim 10, wherein the auxiliary device is a first auxiliary device, and further comprising:
 defining, by the first auxiliary device, usage privileges for enabling remote-control of the electronic features by one or more second auxiliary devices.

15. The method of claim 10, wherein the auxiliary device is a first auxiliary device, and further comprising:
 controlling, by the first auxiliary device, activating and deactivating remote-control of the electronic features by one or more second auxiliary devices.

16. A computer program product that facilitates remotely controlling functions of a vehicle without an integrated touchscreen, the computer program product comprising a computer-readable medium having program instructions embodied therewith, the program instructions executable by a processor of an auxiliary device to cause the processor to:
 determine feature information identifying a set of electronic features of the vehicle that are respectively controlled by electromechanical controls of the vehicle;
 select a subset of electronic features from the set of electronic features of the vehicle based on a location of the auxiliary device relative to the vehicle and a second user identity of a second occupant of the vehicle, wherein the auxiliary device is associated with a first user identity of a first occupant of the vehicle;
 generate a graphical user interface for displaying at the auxiliary device, the graphical user interface comprising one or more graphical controls for controlling only the subset of electronic features of the vehicle;
 establishing a secure wireless connection between the auxiliary device and a control unit of the vehicle that activates remote-control functionality of the subset of electronic features using the one or more graphical controls; and
 facilitate remote control, by the auxiliary device, of the control unit of the vehicle to execute of the subset of electronic features based on interaction with the one or more graphical controls.

17. The computer program product of claim 16, wherein the program instructions further cause the processor to:
 select the subset of electronic features further based on usage privileges granted to the auxiliary device, or a user of the auxiliary device, or a context of the vehicle.

18. The computer program product of claim 16, wherein the auxiliary device is a first auxiliary device, and wherein the program instructions further cause the processor to:
 define usage privileges for enabling remote-control of the electronic features by one or more second auxiliary devices.

19. The computer program product of claim 16, wherein the auxiliary device is a first auxiliary device, and wherein the program instructions further cause the processor to:
 control activating and deactivating remote-control of the electronic features by one or more second auxiliary devices.

20. The computer program product of claim 16, wherein the program instructions further cause the processor to:
 learn behavior of a user of the auxiliary device in association with usage of the graphical user interface to remotely control the subset of electronic features and modifies the one or more graphical controls based on the behavior.

* * * * *